(12) United States Patent
Anzalone et al.

(10) Patent No.: US 8,775,473 B2
(45) Date of Patent: *Jul. 8, 2014

(54) SOFTWARE AND METADATA STRUCTURES FOR DISTRIBUTED AND INTERACTIVE DATABASE ARCHITECTURE FOR PARALLEL AND ASYNCHRONOUS DATA PROCESSING OF COMPLEX DATA AND FOR REAL-TIME QUERY PROCESSING

(75) Inventors: Joseph Kevin Anzalone, Lake in the Hills, IL (US); Nevzat Hurkan Balkir, Hoffman Estates, IL (US); Len Cavers, Villa Park, CA (US); Brian L. Foreman, Lincoln, NE (US)

(73) Assignee: Experian Marketing Solutions, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/366,284

(22) Filed: Feb. 4, 2012

(65) Prior Publication Data
US 2012/0259893 A1 Oct. 11, 2012

Related U.S. Application Data

(63) Continuation of application No. 12/719,217, filed on Mar. 8, 2010, now Pat. No. 8,135,747, which is a continuation of application No. 11/151,137, filed on Jun. 13, 2005, now Pat. No. 7,707,163, which is a continuation-in-part of application No. 11/137,618, filed on May 25, 2005.

(51) Int. Cl.
*G06F 17/30* (2006.01)

(52) U.S. Cl.
CPC ................................ *G06F 17/30* (2013.01)
USPC ........... 707/791; 707/802; 707/814; 707/822; 707/828

(58) Field of Classification Search
CPC ..................................................... G06F 17/30
USPC .................................................. 707/600–899
See application file for complete search history.

(56) References Cited

U.S. PATENT DOCUMENTS 6,775,675 B1 * 8/2004 Nwabueze et al. ........... 707/600

* cited by examiner

*Primary Examiner* — Isaac M Woo
(74) *Attorney, Agent, or Firm* — Nancy R. Gamburd; Gamburd Law Group LLC

(57) ABSTRACT

The various embodiments of the invention provide software and metadata structures for a data processing system and method, for applications such as marketing campaign management, speech recognition and signal processing. An exemplary system embodiment includes a first data repository adapted to store a plurality of entity and attribute data; a second data repository adapted to store a plurality of entity linkage data; a metadata data repository adapted to store a plurality of metadata modules, with a first metadata module having a plurality of selectable parameters, received through a control interface, and having a plurality of metadata linkages to a first subset of metadata modules; and a multidimensional data structure.

36 Claims, 11 Drawing Sheets

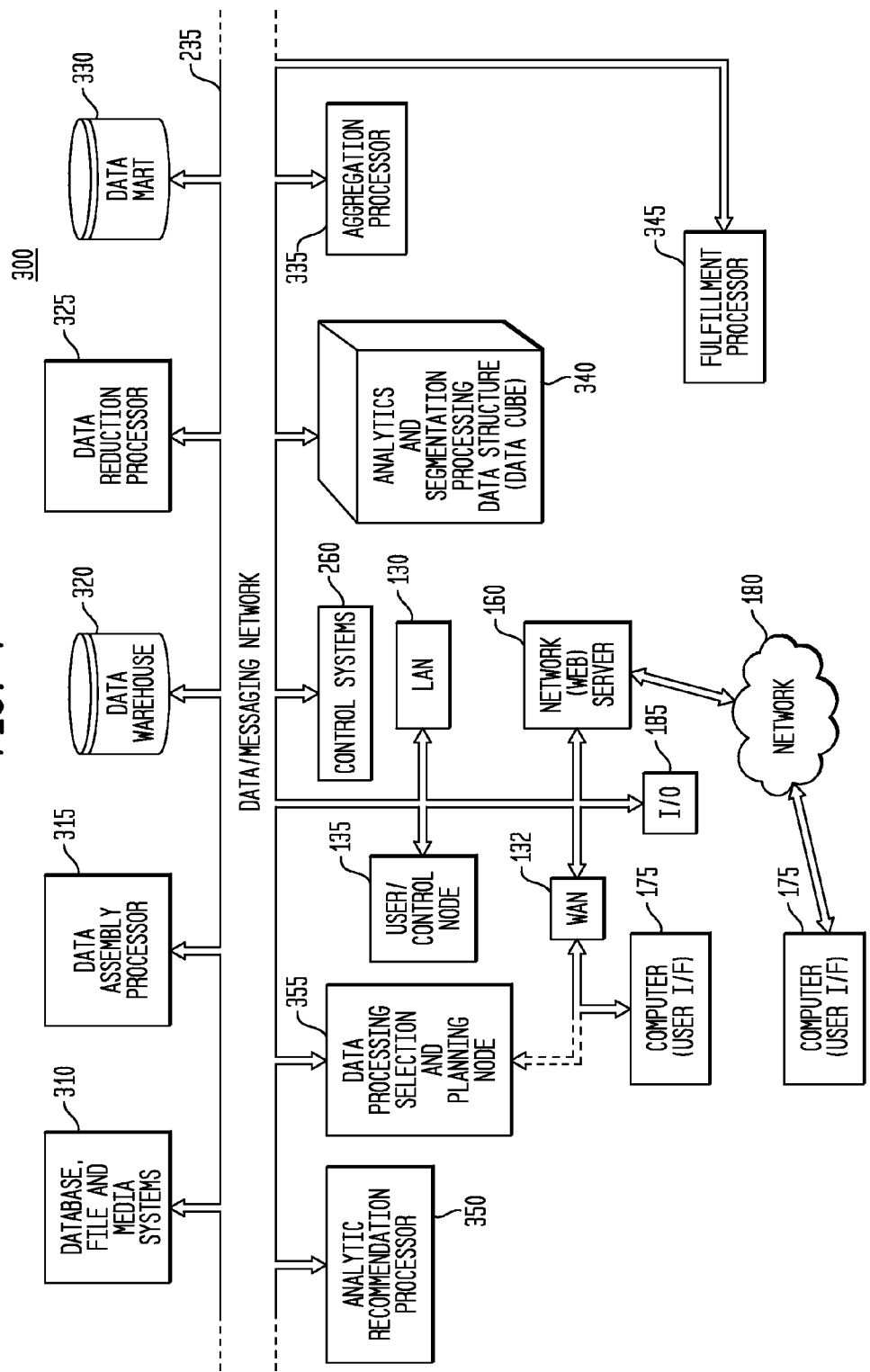

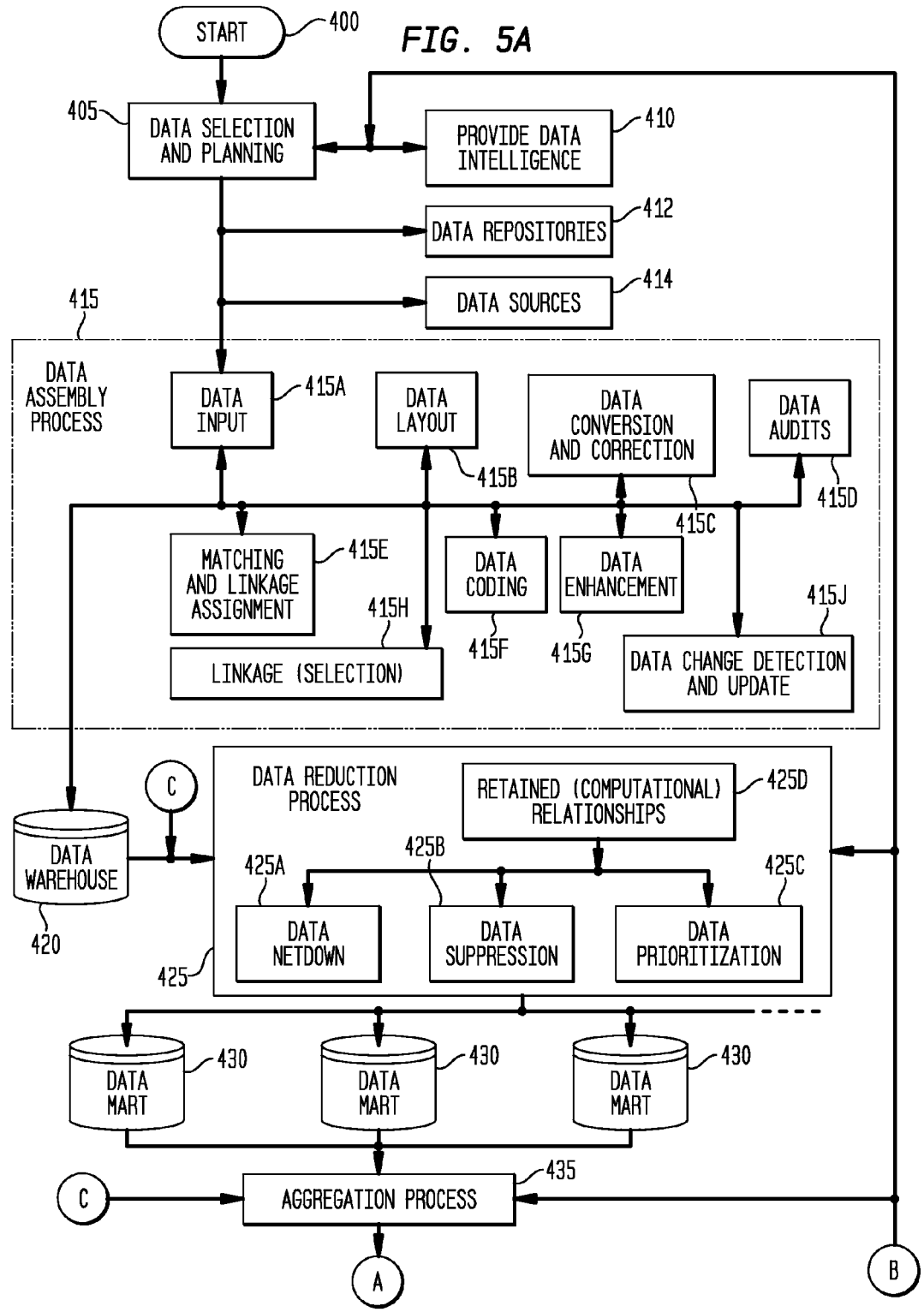

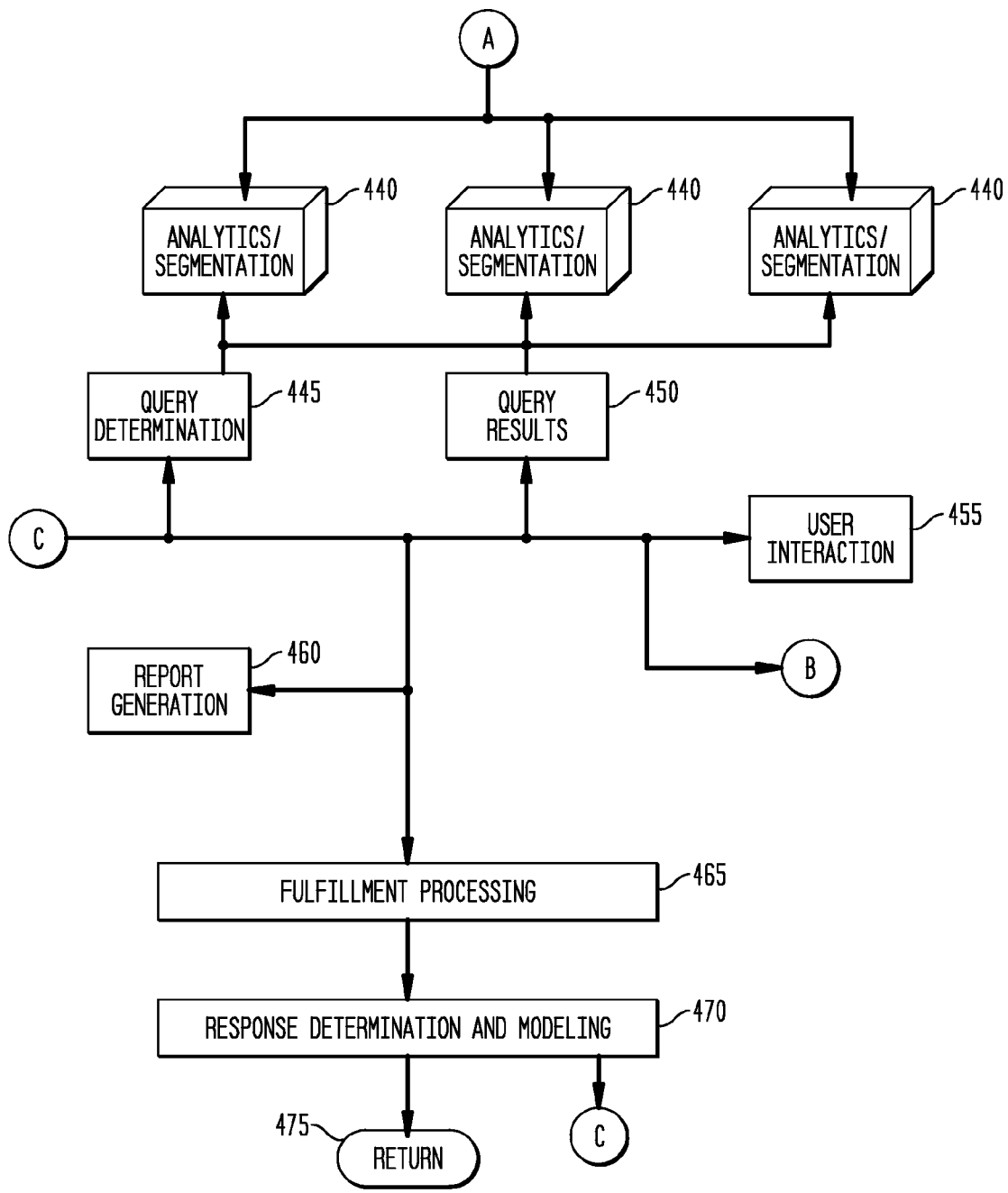

SOFTWARE AND METADATA STRUCTURES FOR DISTRIBUTED AND INTERACTIVE DATABASE ARCHITECTURE FOR PARALLEL AND ASYNCHRONOUS DATA PROCESSING OF COMPLEX DATA AND FOR REAL-TIME QUERY PROCESSING

CROSS-REFERENCE TO RELATED APPLICATION

This application is a continuation of and claims priority to Joseph Kevin Anzalone et al., U.S. patent application Ser. No. 12/719,217, filed Mar. 8, 2010, entitled "Software and Metadata Structures for Distributed And Interactive Database Architecture For Parallel And Asynchronous Data Processing Of Complex Data And For Real-Time Query Processing", which is a continuation of and claims priority to Joseph Kevin Anzalone et al., U.S. patent application Ser. No. 11/151,137, filed Jun. 13, 2005 and issued Apr. 27, 2010 as U.S. Pat. No. 7,707,163, entitled "Software and Metadata Structures for Distributed And Interactive Database Architecture For Parallel And Asynchronous Data Processing Of Complex Data And For Real-Time Query Processing", which are commonly assigned herewith, the entire contents of which are incorporated herein by reference with the same full force and effect as if set forth in their entireties herein, and with priority claimed for all commonly disclosed subject matter.

U.S. patent application Ser. No. 11/151,137 is also a continuation-in-part of and claims priority to Nevzat Hurkan Balkir et al. U.S. patent application Ser. No. 11/137,618, filed May 25, 2005, entitled "Distributed And Interactive Database Architecture For Parallel And Asynchronous Data Processing Of Complex Data And Real-Time Query Processing,", which is commonly assigned herewith, the contents of which are incorporated by reference herein, and with priority claimed for all commonly disclosed subject matter (the "related application").

FIELD OF THE INVENTION

The present invention, in general, relates to database management systems, and more particularly, relates to a software and metadata structures for distributed and interactive database architecture for parallel and asynchronous data processing of complex data and real-time query processing, with a plurality of applications such as, for example, marketing campaign management, scientific research, and speech and signal processing.

BACKGROUND OF THE INVENTION

Data processing of complex types of data, such as processing of millions to hundreds of millions of records of individuals, businesses and other entities, has historically been performed as a batch process using large mainframe computers. These large quantities of data were typically input into the processing system using a physical medium such as magnetic tape or electronic/magnetic disk. Once data processing began, the process would continue largely uninterrupted, over the course of several hours to several weeks, and output data would be provided.

For marketing campaigns such as catalogue mailings, promotional mailings and offers, a client or other system user would request the use of various databases and mailing lists, as input data, and would then be required to specify, in advance of data processing, how the data should be segmented to provide the resulting campaign list, such as a mailing list. For example, the various lists and databases may include hundreds of millions of records of individuals, while the resulting campaign would be for a mailing to 10,000 individuals who meet certain criteria, such as home ownership, previous purchasing patterns, and so on.

Similarly, in various scientific and medical research areas, such as phase three drug evaluations, huge amounts of data may be generated which must be processed to detect various statistical patterns, such as efficacy in a larger population, dosage requirements, significant side effects and interactions with other drugs. In addition, many studies are conducted in numerous locations, with data collected throughout the world. Again, vast quantities of data must be processed, and must result in a selection of individuals who meet certain criteria, such as having certain adverse reactions.

In other areas such as speech and signal processing, vast quantities of data may be collected and must be analyzed. For accurate speech recognition and speech generation, vast data stores may be generated, for thousands of analog electronic signals which must be digitized and parsed into corresponding phonemes, for thousands of words, for thousands of sentences, in any of numerous languages, each with potentially different pitch, timing and loudness (collectively, prosody), each with different co-articulations based on preceding and subsequent words and phonemes, and each from thousands of individuals. In addition, huge amounts of data to be analyzed may be collected, such as for intelligence services to analyze speech signals received from mobile communications for potentially unlawful or dangerous activities. Again, vast quantities of data must be processed, and must result in a selection of words and corresponding pronunciations that meet certain criteria, such as having a likelihood of fit to selected phoneme patterns from a plurality of different speakers of a plurality of different languages, with high discrimination and noise immunity.

Because of the batch processing environment of the computing systems required to manage such large data volumes, in the prior art all such segmentation or other selection criteria had to be specified in advance. Unfortunately, the selection criteria may not be known in advance, particularly where the determination of the selection criteria is itself dependent upon the accumulated data, such as in areas of marketing campaigns, scientific research and speech and signal processing. In addition, based upon the data results, a user may want to modify the selection criteria, and is unable to do so in prior art systems, without repeating all of the processing with the modified criteria.

Other prior art forms of real-time data analysis have largely been confined to significantly less complex data types, typically solely numerical data, such as sales and revenue data, capable of straightforward arithmetic and algebraic manipulations (e.g., sums and averages) and numerical methods of analysis (e.g., Riemann summation). Prior art data analysis systems have not succeeded at providing real-time analysis of more complicated data, particularly complex data which requires set operations and not arithmetic manipulations. For example, prior art data analysis systems have not allowed for real-time data analysis of voluminous personal attribute data for marketing campaign determination and management, to provide a resulting set of individuals or households who meet certain criteria, particularly where the criteria may be determined dynamically and interactively, in real-time.

A need remains, therefore, for a database system architecture which can process such vast amounts of complex data, in parallel and asynchronously for higher data throughput, which provides for set operations, and which allows real-time query processing for user interactivity, such as for data analysis and modifying selection criteria. Such a database system architecture should be capable of processing complicated data types, from personal attribute data to speech and signal processing data.

SUMMARY OF THE INVENTION

The various exemplary embodiments of the present invention provide a data processing system and architecture for distributed processes which can be performed in parallel and asynchronously, not only providing for high speed data processing, but also providing effective and valuable decoupling of the provision of output data from the provision of input data. The various exemplary embodiments utilize a new form of metadata, which is not only utilized to define data relationships and data structures, but also is utilized to define processes to be performed on the data. The inventive metadata of the various exemplary embodiments is comprised of a plurality of parameterized metadata modules and metadata linkages, providing for both dynamic and static parameters, and allowing the various systems and processes to be fully customizable, fully standardized, and everything in between.

The exemplary systems and processes provide for user interactivity, with a user enabled to provide input, and make selections and decisions, throughout extensive data processing, and to modify previous decisions. Furthermore, such selections and decisions may be made of the basis of actual data analysis and segmentation, provided through real-time user queries and system query responses. The exemplary systems and processes allow for the introduction of artificial intelligence processing, with an analytic recommendation processor or engine (also referred to as an "information consultant") provided to aid in the various user selections and decisions, also based on actual data analysis and segmentation.

The various exemplary embodiments may be applied to a wide variety of data and signal processing applications, including marketing campaign management, speech and signal processing, and scientific research.

In a first exemplary embodiment, a data processing system for marketing campaign management, comprises a plurality of data repositories, a control interface, a multidimensional data structure, and a plurality of processing nodes. A first data repository of the plurality of data repositories is adapted to store a plurality of entity and attribute data. A second data repository of the plurality of data repositories is adapted to store a plurality of entity linkage data. A metadata data repository of the plurality of data repositories is adapted to store a plurality of metadata modules, in which a first metadata module of the plurality of metadata modules has a plurality of selectable parameters received through the control interface. The plurality of processing nodes are adapted to use the plurality of selectable parameters to assemble a first plurality of data from the first and second data repositories and from input data, to reduce the first plurality of data to form a second plurality of data, and to aggregate and dimension the second plurality of data for storage in the multidimensional data structure.

In the various exemplary embodiments, the control interface is further adapted to modify the plurality of selectable parameters in response to received control information. The various exemplary embodiments may also include a data input adapted to receive information from a plurality of data sources selectable through the control interface. The control interface may further comprise a user interface which is adapted to provide for selection of the plurality of selectable parameters, selection of a plurality of attributes for data processing, selection and ordering of a subset of data processes of the plurality of data processes, and selection of a plurality of dimensions for aggregation.

The first metadata module has a corresponding plurality of metadata linkages to a first subset of metadata modules of the plurality of metadata modules, wherein the corresponding plurality of metadata linkages comprise at least one of the following metadata linkage types: a communicated parameter of the plurality of modifiable parameters, a communicated attribute of a plurality of attributes, a process definition, a process flow, or a process communication.

In the various exemplary embodiments, the plurality of processing nodes may be adapted to perform in parallel and asynchronously at least two of the following processes: a data input process, a data layout process, a data conversion process, a data correction process, a data audit process, a data matching process, a linkage assignment process, a data coding process, a data enhancement process, a data change detection process, or a data update process. The plurality of processing nodes may also be adapted to use modeled information to provide a version of the plurality of selectable parameters.

In the various exemplary embodiments, the plurality of processing nodes may be further adapted to reduce the first plurality of data to form the second plurality of data, in parallel and asynchronously, and to store in an associated memory interim results comprising entity linkage data having a plurality of persistent identifiers, using at least one of the following processes: a data netdown process, a data suppression process, or a data prioritization process.

In the various exemplary embodiments, at least one processing node of the plurality of processing nodes may be adapted to process a query and provide a query response, using the multidimensional data structure. In addition, in exemplary embodiments, at least one processing node of the plurality of processing nodes may be adapted to determine a plurality of sets from the multidimensional data structure and to perform a plurality of set operations on the plurality of sets, the plurality of set operations comprising union operations and difference operations, such as to determine a plurality of mutually exclusive sets from a plurality of sequential union sets by forming a difference set by subtracting a previous union set from a next union set.

In the various exemplary embodiments, the plurality of processing nodes may be further adapted to use a modified plurality of selectable parameters to reduce the first plurality of data to form a modified second plurality of data; to use the modified plurality of selectable parameters to aggregate and dimension the modified second plurality of data; or to use a modified plurality of selectable parameters to re-aggregate and re-dimension the second plurality of data.

Also in the various exemplary embodiments, at least one processing node of the plurality of processing nodes may be adapted to provide a plurality of dimensions for aggregation of the second plurality of data, or adapted to dimension the second plurality of data using a plurality of attribute ranges selectable through the control interface.

Also in the various exemplary embodiments, the plurality of processing nodes are further adapted to provide a marketing campaign fulfillment process, in which the marketing campaign fulfillment process comprising at least one of the following processes: report generation; postal services; postal presort services; inkjet services; printing preparation services; shipping services; data extraction; email formatting; generation of a magnetic tape, disk or electronic file having selected names and physical addresses; generation of email addresses; selected content determination; selected communication channel determination, variable formatting, and variable layout.

In the various exemplary embodiments, the system may also include a data processing selection and planning node coupled to the plurality of processing nodes, the data processing selection and planning node adapted to provide the plurality of selectable parameters in response to user input.

Also in the various exemplary embodiments, the plurality of metadata modules define the plurality of data processes and further define a plurality of data structures stored in the plurality of data repositories. The plurality of metadata modules may be comprised of at least two metadata modules of the following group: a parties module, an accounting module, a hardware resource module, an activities definition module, a service invocation module, a process definition module, a marketing campaign definition module, a list selection module, a list layout module, and a data enhancement module. In selected embodiments, the marketing campaign definition module has a metadata linkage to the activities definition module, wherein the activities definition module defines a plurality of activities comprising a selected marketing campaign; the activities definition module has a metadata linkage to the process definition module, wherein the process definition module defines the plurality of data processes comprising a selected activity; and the parties module and the activities definition module each have a metadata linkage to the accounting module, wherein the accounting module tracks costs and expenses associated with a plurality of activities for a selected party of a plurality of parties defined in the parties module.

The entity linkage data may comprise plurality of persistent identifiers linking individual or household entities to a corresponding plurality of attributes, the corresponding plurality of attributes comprising at least two of the attributes of the following group of attributes: name, current address, name and address variations, previous address, age, gender, income, social security number, vehicle ownership, marital status, spouse name, spouse address, children names, children addresses, household identification, home ownership, purchasing histories, marketing responses, and employment histories.

Also in the various exemplary embodiments, the plurality of data repositories comprises one or more databases having relational schema, a data warehouse having relational schema, and a data mart having a star or snowflake schema; and the multidimensional data structure has a multidimensional, on-line analytical processing (OLAP) data cube schema. The plurality of data repositories may be embodied as one or more of the following group of data storage devices: a stored area network (SAN) magnetic disk array, a memory, a mainframe file system, partitioned database storage, a Unix file system, or a Windows file system; while the plurality of processing nodes may be embodied as one or more of the following group of processors: a mainframe processing node, a clustered database node, a Unix application node, or a Windows application node.

In another exemplary embodiment, a data processing system includes: a control interface adapted to receive a first plurality of selectable parameters, a second plurality of selectable parameters, and a third plurality of selectable parameters, the control interface further adapted to modify the first, second and third pluralities of selectable parameters in response to received control information; a data input adapted to receive input data; a data and messaging network coupled to the control interface and to the data input interface; a first data repository coupled to the data and messaging network, the first data repository adapted to store a plurality of entity data and a plurality of corresponding entity attribute data; a linkage data repository coupled to the data and messaging network, the linkage data repository adapted to store a plurality of unique and persistent identifiers wherein each persistent identifier corresponds to each unique entity; a data assembly processor coupled to the data and messaging network, the data assembly processor adapted to use the first plurality of selectable parameters to generate a first plurality of data from the first data repository, from the linkage data repository, and from input data; a second data repository coupled to the data and messaging network, the second data repository adapted to store the first plurality of data; a data reduction processor coupled to the data and messaging network, the data reduction processor adapted to use the second plurality of selectable parameters to generate a second plurality of data from the first plurality of data; a third data repository coupled to the data and messaging network, the third data repository adapted to store the second plurality of data; an aggregation processor coupled to the data and messaging network, the aggregation processor adapted to use the third plurality of selectable parameters to aggregate and dimension the second plurality of data; and a multidimensional data structure coupled to the data and messaging network, the multidimensional data structure adapted to store the aggregated and dimensioned second plurality of data.

In another exemplary embodiment, a parallel and asynchronous data processing system for marketing campaign management includes a user interface; a control interface; a plurality of data processing nodes coupled through a data and messaging network to the user interface and to the control interface, the plurality of data processing nodes adapted to process data; a first data repository coupled through the data and messaging network to the plurality of data processing nodes, the first data repository adapted to store a plurality of entity name and address information, and a plurality of corresponding entity attribute information; a linkage data repository coupled through the data and messaging network to the plurality of data processing nodes, the linkage data repository adapted to store a plurality of unique and persistent identifiers wherein each persistent identifier corresponds to each unique entity; a second data repository coupled through the data and messaging network to the plurality of data processing nodes, the second data repository adapted to store a first subset of information from the first data repository and the linkage data repository, the first subset of information including a first subset of entity attribute information; an aggregated and multidimensional data structure coupled through the data and messaging network to the plurality of data processing nodes, the aggregated and multidimensional data structure having an aggregation of the first subset of information dimensioned with a first plurality of selected attributes of the first subset of entity attribute information, wherein the first plurality of selected attributes are adapted to be modifiable during data processing through the user interface or the control interface; and wherein the plurality of data processing nodes are further adapted to determine the first subset of information stored in the second data repository and to aggregate and dimension the first subset of information using the first plurality of selected attributes.

In another exemplary embodiment, a data processing method for marketing campaign management includes: storing a plurality of entity and attribute data in a first data repository of a plurality of data repositories; storing a plurality of entity linkage data in a second data repository of the plurality of data repositories; receiving a plurality of selectable parameters; storing a plurality of metadata modules in a metadata data repository of the plurality of data repositories, a first metadata module of the plurality of metadata modules referencing the plurality of selectable parameters; using the plurality of selectable parameters, assembling a first plurality of data from the first and second data repositories and from input data; using the plurality of selectable parameters, reducing the first plurality of data to form a second plurality of data; using the plurality of selectable parameters, aggregating and dimensioning the second plurality of data; and storing the aggregated and dimensioned second plurality of data in a multidimensional data structure.

In yet another exemplary embodiment, the present invention provides a tangible medium storing computer readable software for programming a parallel and asynchronous database architecture and data processing system for execution of marketing campaign management and analysis, comprising a plurality of program means, such as computer- or server-executable instructions. The plurality of program means include first program means for receiving a plurality of selectable parameters, for modifying the plurality of selectable parameters in response to received control information or in response to modeled information to form a modified plurality of selectable parameters; second program means for storing a plurality of entity and attribute data in a first data repository of a plurality of data repositories and for storing a plurality of entity linkage data in a second data repository of the plurality of data repositories; and for storing a plurality of metadata modules in a metadata data repository of the plurality of data repositories, a first metadata module of the plurality of metadata modules referencing the plurality of selectable parameters; third program means for using the plurality of selectable parameters to assemble in parallel and asynchronously a first plurality of data from the first and second data repositories and from input data; to reduce the first plurality of data to form a second plurality of data; and to dimension and aggregate the second plurality of data; fourth program means for storing the dimensioned and aggregated second plurality of data in a multidimensional data structure; fifth program means for processing a query and providing a query response using the multidimensional data structure; and sixth program means for using the modified plurality of selectable parameters to reduce the first plurality of data to form a modified second plurality of data; and using the modified plurality of selectable parameters to dimension and aggregate the modified second plurality of data.

In yet another exemplary embodiment, the present invention provides a tangible medium storing computer readable program instructions for execution by a computer system for marketing campaign management and analysis. The tangible medium storing computer readable program instructions comprises: a first metadata construct of a plurality of metadata constructs, the first metadata construct defining a plurality of data processes for marketing campaign management; a second metadata construct of the plurality of metadata constructs, the second metadata construct having a corresponding metadata linkage to the first metadata construct, of a plurality of metadata linkages, the second metadata construct defining a first plurality of relational data structures for a first plurality of data repositories of the computer system, the second metadata construct further defining a multidimensional data structure for a second data repository for marketing campaign analysis; and a third metadata construct of the plurality of metadata constructs, the third metadata construct having a corresponding metadata linkage to the first metadata construct, of the plurality of metadata linkages, the third metadata construct defining a plurality of input data sources and a plurality of selectable attributes.

The exemplary embodiment may also include a fourth metadata construct adapted to provide a plurality of modifiable parameters to the first metadata construct, the plurality of modifiable parameters providing for selection of the plurality of input data sources and selection of a first subset of the plurality of data processes for execution by the computer system. The plurality of selectable input data sources comprise a plurality of databases and marketing lists containing a plurality of attributes, the plurality of attributes comprising at least two attribute types of the following group of attribute types: a name attribute, an address attribute, a demographic attribute, a behavioral attribute, or an attitudinal attribute.

The exemplary embodiment may also include a fifth metadata construct adapted to execute the first subset of the plurality of data processes in parallel and asynchronously, using the plurality of modifiable parameters and a corresponding plurality of metadata linkages to other metadata constructs. The first subset of the plurality of data processes comprises at least two data assembly processes of the following group of data assembly processes: a data input process, a data layout process, a data conversion process, a data correction process, a data audit process, a data matching process, a linkage assignment process, a linkage selection process, a data coding process, a data enhancement process, a data change detection process, or a data update process. A second subset of the plurality of data processes comprises at least one data reduction process of the following group of data reduction processes: a data netdown process, a data suppression process, or a data prioritization process.

The exemplary embodiment may also include a third subset of the plurality of data processes which are adapted to use the multidimensional data structure to process a received query and to provide a query response.

The plurality of metadata linkages typically comprise at least one metadata linkage type of the following group of metadata linkage types: a common or communicated parameter of the plurality of modifiable parameters, a common or communicated attribute of a plurality of attributes, a common process definition, a common process flow, or a communication between processes.

The exemplary embodiment may also include a sixth metadata construct of plurality of metadata constructs, the sixth metadata construct adapted to track each data process invocation of a plurality of data process invocations; a seventh metadata construct of the plurality of metadata constructs, the seventh metadata construct adapted to associate a cost factor with each data process invocation of a plurality of data process invocations; an eighth metadata construct of the plurality of metadata constructs, the eighth metadata construct adapted to associate a resource usage factor with each data process invocation of a plurality of data process invocations; and a ninth metadata construct of the plurality of metadata constructs, the ninth metadata construct defining a plurality of marketing campaigns, each marketing campaign of the plurality of marketing campaigns associated with a corresponding selection of data processes of the plurality of data processes, and each marketing campaign of the plurality of marketing campaigns associated with a corresponding party of a plurality of parties.

The exemplary embodiment may also include a tenth metadata construct of the plurality of metadata constructs, the tenth metadata construct adapted to use the plurality of selectable attributes for a dimensioning and aggregating data for storage in the multidimensional data structure.

The exemplary embodiment may also include an eleventh program construct adapted to determine a plurality of available variations of at least one of the following: selectable data processes, selectable data attributes, or selectable data segmentations; a twelfth program construct adapted to provide data modeling and data analysis using the plurality of modifiable parameters, the plurality of selectable input data sources, and the plurality of selectable attributes; and a thirteenth program construct adapted to provide at least one selection recommendation for the plurality of modifiable parameters, the plurality of selectable input data sources, or the plurality of selectable attributes.

In yet another exemplary embodiment, the present invention provides a tangible medium storing computer readable software for programming a parallel and asynchronous database architecture and data processing system for marketing campaign management and analysis. The tangible medium storing computer readable software comprises a first program construct of a plurality of program constructs, the first program construct comprising a plurality of modifiable parameters adapted to be modifiable during data processing, the first program construct further defining a plurality of selectable input data sources and a plurality of selectable attributes; a second program construct of the plurality of program constructs, the second program construct having a corresponding metadata linkage to the first program construct, the second program construct defining a plurality of data structures for a plurality of data repositories of the computer system, the plurality of data structures comprising at least one relational data structure and at least one multidimensional data structure; a third program construct of the plurality of program constructs, the second program construct having corresponding metadata linkages to the first and second program constructs, the third program construct adapted to provide for execution of a plurality of data processes using the plurality of modifiable parameters, the plurality of input data sources and the plurality of selectable attributes, the third program construct further adapted to store a plurality of results of the plurality of data processes in the plurality of data structures; and a fourth program construct of the plurality of program constructs, the fourth program construct having corresponding metadata linkages to the first, second and third program constructs, the fourth program construct adapted to use the plurality of selectable attributes for a dimensioning and aggregating data for storage in the multidimensional data structure.

The plurality of data processes may also be adapted to execute in parallel and asynchronously using a plurality of data processing nodes of the data processing system. The exemplary embodiment may also provide for the storage in a memory or in a database of a corresponding plurality of interim results from the asynchronous and parallel execution of the plurality of data processes, which may be as a corresponding set of unique identifiers.

In yet another exemplary embodiment, the present invention provides a tangible medium storing computer readable program instructions for execution by a computer system for marketing campaign management and analysis. The tangible medium storing computer readable program instructions comprises: a first program module defining a plurality of modifiable parameters adapted to be modifiable during data processing and a plurality of selectable attributes; a second program module defining a plurality of selectable input data sources, the plurality of selectable input data sources comprising at least one consumer database and a plurality of consumer lists of individuals and households; a third program module defining a plurality of data structures for a plurality of data repositories of the computer system, the plurality of data structures comprising a first relational data structure, a second relational data structure storing a subset of information from the first relational data structure, and at least one multidimensional data structure; a fourth program module adapted to execute a plurality of marketing campaign management data processes using the plurality of modifiable parameters, the plurality of selectable input data sources and the plurality of selectable attributes, the fourth program construct further adapted to perform a first plurality of data assembly processes and store assembled data in the first relational data structure, and to perform a second plurality of data reduction processes on the assembled data and store reduced data in the second relational data structure; a fifth program module adapted to use the plurality of selectable attributes for dimensioning and aggregation of the reduced data for storage in the multidimensional data structure; a sixth program module to correlate invocation of the plurality of marketing campaign management data processes with accounting functions and resource utilization; and a seventh program module to track selection of the plurality of consumer lists.

In yet another exemplary embodiment, the present invention provides a tangible medium storing a plurality of metadata modules for execution by a computer system for marketing campaign management and analysis, the tangible medium comprising: a first metadata module of a plurality of metadata modules, the first metadata module comprising a plurality of modifiable parameters adapted to be modifiable during data processing; a second metadata module of the plurality of metadata modules, the second metadata module defining a plurality of selectable input data sources comprising at least one consumer database and a plurality of consumer lists; a third metadata module of the plurality of metadata modules, the third metadata module defining a plurality of data structures for a plurality of data repositories of the data processing system, the plurality of data structures comprising a first relational data structure storing a first subset of information, a second relational data structure storing a second subset of information from the first relational data structure, and at least one multidimensional data structure storing a third subset of information from the second relational data structure which has been dimensioned and aggregated; a fourth metadata module of the plurality of metadata modules, the fourth metadata module having corresponding metadata linkages to the first, second and third metadata modules, the fourth metadata module adapted to execute a plurality of data assembly processes using the plurality of selectable input data sources and the plurality of modifiable parameters to form the first subset of information, the fourth metadata module further adapted to execute a plurality of data reduction processes using plurality of modifiable parameters to form the second subset of information; a fifth metadata module of the plurality of metadata modules, the fifth metadata module adapted to dimension and aggregate the second subset of information to form the third subset of information, using a plurality of selectable attributes; a sixth metadata module of the plurality of metadata modules, the sixth metadata module adapted to perform a plurality of set operation on the third subset of information using the plurality of selectable attributes; a seventh metadata module of the plurality of metadata modules, the seventh metadata module adapted to utilize the multidimensional data structure to process a query and to generate a response to the query; and an eighth metadata module of the plurality of metadata modules, the eighth metadata module adapted to provide at least one selection recommendation for the plurality of modifiable parameters, the plurality of selectable input data sources, or the plurality of selectable attributes.

In yet another exemplary embodiment, the present invention provides tangible medium storing computer readable software for programming a parallel and asynchronous database architecture and data processing system for marketing campaign management and analysis. The tangible medium storing computer readable software comprises: a first program construct of a plurality of program constructs, the first program construct comprising a plurality of modifiable parameters adapted to be modifiable during data processing; a second program construct of a plurality of program constructs, the second program construct having a corresponding metadata linkage to the first program construct, the second program construct adapted to obtain a first modifiable parameter of the plurality of modifiable parameters from the first program construct, the second program construct further adapted to provide for execution of a first data process of a plurality of data processes using the first modifiable parameter; a third program construct of the plurality of program constructs, the third program construct having a second metadata linkage to the first program construct, the third program construct adapted to obtain a second modifiable parameter of the plurality of modifiable parameters from the first program construct, the third program construct adapted to execute a multithreaded data process of the plurality of data processes, in parallel and asynchronously using the second modifiable parameter, through a plurality of third metadata linkages to a subset of program constructs of the plurality of program constructs, wherein a selected program construct of the subset of program constructs is further adapted to perform a set intersection operation on a corresponding plurality of sets of unique identifiers resulting from the asynchronous and parallel execution of the multithreaded process; and wherein a first subset of modifiable parameters of the plurality of modifiable parameters define a plurality of selectable input data sources, a second subset of modifiable parameters of the plurality of modifiable parameters define a plurality of selectable attributes, and wherein the plurality of data processes comprise at least two of the following data processes: a data assembly process, a data reduction process, a data aggregation process, or a data fulfillment process.

These and additional embodiments are discussed in greater detail below. Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings and examples which form a portion of the specification, in which:

FIG. 4 is a block diagram illustrating a third exemplary system embodiment in accordance with the teachings of the present invention.

FIG. 5, divided into FIGS. 5A and 5B, is a flow diagram illustrating an exemplary method embodiment in accordance with the teachings of the present invention.

DETAILED DESCRIPTION OF THE EXEMPLARY EMBODIMENTS

Figure 1:
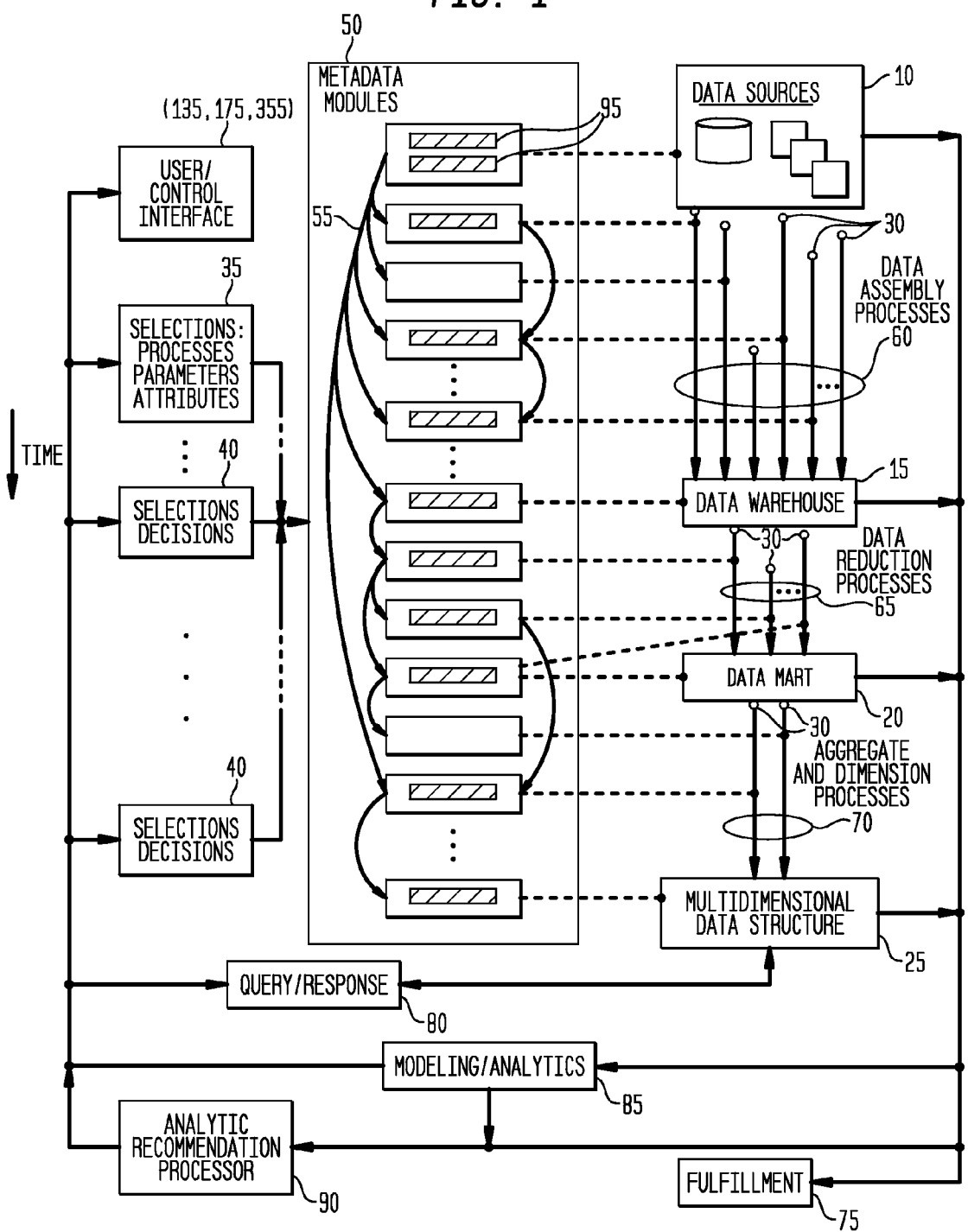
FIG. 1 is a block diagram illustrating exemplary system interaction, metadata and process flows of the various exemplary system and method embodiments in accordance with the teachings of the present invention.

While the present invention is susceptible of embodiment in many different forms, there are shown in the drawings and will be described herein in detail specific examples and embodiments thereof, with the understanding that the present disclosure is to be considered as an exemplification of the principles of the invention and is not intended to limit the invention to the specific examples and embodiments illustrated.

Referring now to the drawings wherein like reference numerals are used to identify identical components in the various views, FIG. 1 is a block diagram illustrating exemplary system interaction, metadata and process flows of the various exemplary system and method embodiments in accordance with the teachings of the present invention. The various system 100, 200, 300 embodiments are discussed in greater detail with reference to FIGS. 2-4 and 10.

FIG. 1 illustrates several truly novel features of the present invention. First, the exemplary systems and processes utilize a new form of metadata defining both processes and data structures (such as entities, tables, relationships). The inventive metadata is further comprised of a plurality of parameterized metadata modules and metadata linkages, providing for both dynamic and static parameters, allowing the various systems and processes to be fully customizable, fully standardized, and everything in between. Second, the exemplary system architecture provides for distributed processes which can be performed in parallel and asynchronously, providing for high speed data processing and effective and valuable decoupling of the provision of output data from the provision of input data. Third, the exemplary systems and processes provide for user interactivity, with a user enabled to provide input, and make selections and decisions, throughout the extensive data processing, and to modify previous decisions. Furthermore, such selections and decisions may be made of the basis of actual data analysis and segmentation, provided through real-time queries and responses, unavailable in the prior art. Lastly, the exemplary systems and processes allow for the introduction of artificial intelligence processing, with an analytic recommendation processor ("ARP") (also referred to as a "virtual information consultant") provided to aid in the various user selections and decisions, also based on actual data analysis and segmentation.

Referring to FIG. 1, a plurality of metadata modules 50 are utilized to define and specify system processes, flows, versions, parameters (modifiable/dynamic and unmodifiable/ static), entities, attributes, users/clients, hardware resources, data sources, data repositories (data relationships and data structures), and all other features utilized in the various exemplary systems. The metadata modules 50 are interconnected, illustrated as interconnections 55, with the interconnections referred to as "metadata linkages", to distinguish other forms of linkage utilized with the various embodiments of the invention. The various metadata linkages may occur in a variety of ways, such as through shared or otherwise common or communicated parameters, common (shared) attributes, common or communicated process definitions, and common or communicated process elements or flows, for example. The various parameters (dynamic and static) are illustrated as parameters 95, as additional illustration of metadata linkage through parameter sharing, such as parameters utilized across multiple processes defined by a corresponding plurality of metadata modules 50. As discussed below, the metadata modules 50 are typically implemented as a form of software or programming instructions, such as in various forms of SQL (SEQUEL), MY SQL, DB2, ORACLE, C, C++, Java, XML, and may be developed through one or more corresponding and commercially available application programming interfaces ("APIs") provided by many service and software companies.

The systems 100, 200, 300 are comprised of a plurality of data repositories and data structures and a plurality of processing nodes 30. As illustrated in FIG. 1, the various data repositories and data structures include data sources 10, data warehouse 15, data mart 20, and multidimensional data structure 25. The plurality of processing nodes 30 perform a plurality of data processes, illustrated as data assembly processes 60, data reduction processes 65, aggregate and dimension processes 70, and a fulfillment process 75, and may do so in parallel and asynchronously, depending upon the selected embodiment. As a consequence, any data output has been effectively decoupled from data input, allowing tremendous versatility for rapid data processing, data updating, data analysis and modeling, and other data processes.

The various metadata modules 50 are illustrated as correspondingly mapping to the plurality of data processes, data sources/inputs and data repositories and data structures, as the metadata modules 50 define the processes, provide for invocation of the processes, determine the data structures to be utilized or created, provide for various needed parameters, attribute selection, data input selection, and other customizable features. As a consequence, the metadata of the present invention is parameterized, namely, providing for the use of variable or dynamic parameters, such as varying confidence levels, attribute choices, process selection, process ordering, and so on, in addition to providing for static parameters. Through the parameterized metadata, the data processing of the present invention may be provided in different versions, different process flows, and may be completely customizable. In addition, through the use of default values, the data processing of the present invention may be completely standardized or fixed. Through a combination of default and selected values, the data processing of the present invention provides a complete panorama, from fully customizable to fully standardized and everything in between.

The parameters, attribute selection, process selection, process ordering, selected dimensions for aggregation into the multidimensional data structure (25), and other customizable features, may be entered into the system through a user or control interface or terminal (135, 175, 355), such as through a graphical user interface on a personal computer, coupled to the exemplary systems through a network, such as a LAN or the Internet. Through the user or control interface (135, 175, 355), virtually all aspects of the data processing may be controlled, and controlled interactively and dynamically. For example, at the beginning of the data processing, a user may make selections concerning which data sources and data inputs (10) will be utilized, which processes (e.g., 60, 65, 70, 75) will be utilized, using which parameters, and using which selected attributes (35). At other times during the data processing (indicated as a subsequent time), a user may make other or additional selections concerning which processes, parameters and attributes will be utilized, and may also modify earlier selections and decisions (40).

As a significant consequence, important decisions may be made throughout the data processing, and may be made based on real-time data analytics, segmentation and modeling, such as by evaluating various "what if" scenarios using the actual data which has been generated. This intelligence is provided through the use of interactive and real-time queries and responses (80), providing different analyses and segmentation of the multidimensional data structure 25. In addition, various decision suggestions may be received by the user from the analytic recommendation processor 90 based, for example, upon modeling and analytics (85), such as modeling from previous marketing campaigns and modeling from real-time analyses and segmentation of the multidimensional data structure 25.

The exemplary embodiments of the invention also provide for massively parallel and asynchronous data processing. Such processing is supported by the plurality of metadata modules, which are also adapted to provide for execution of such multithreaded data processes, across multiple processors.

Figure 2:
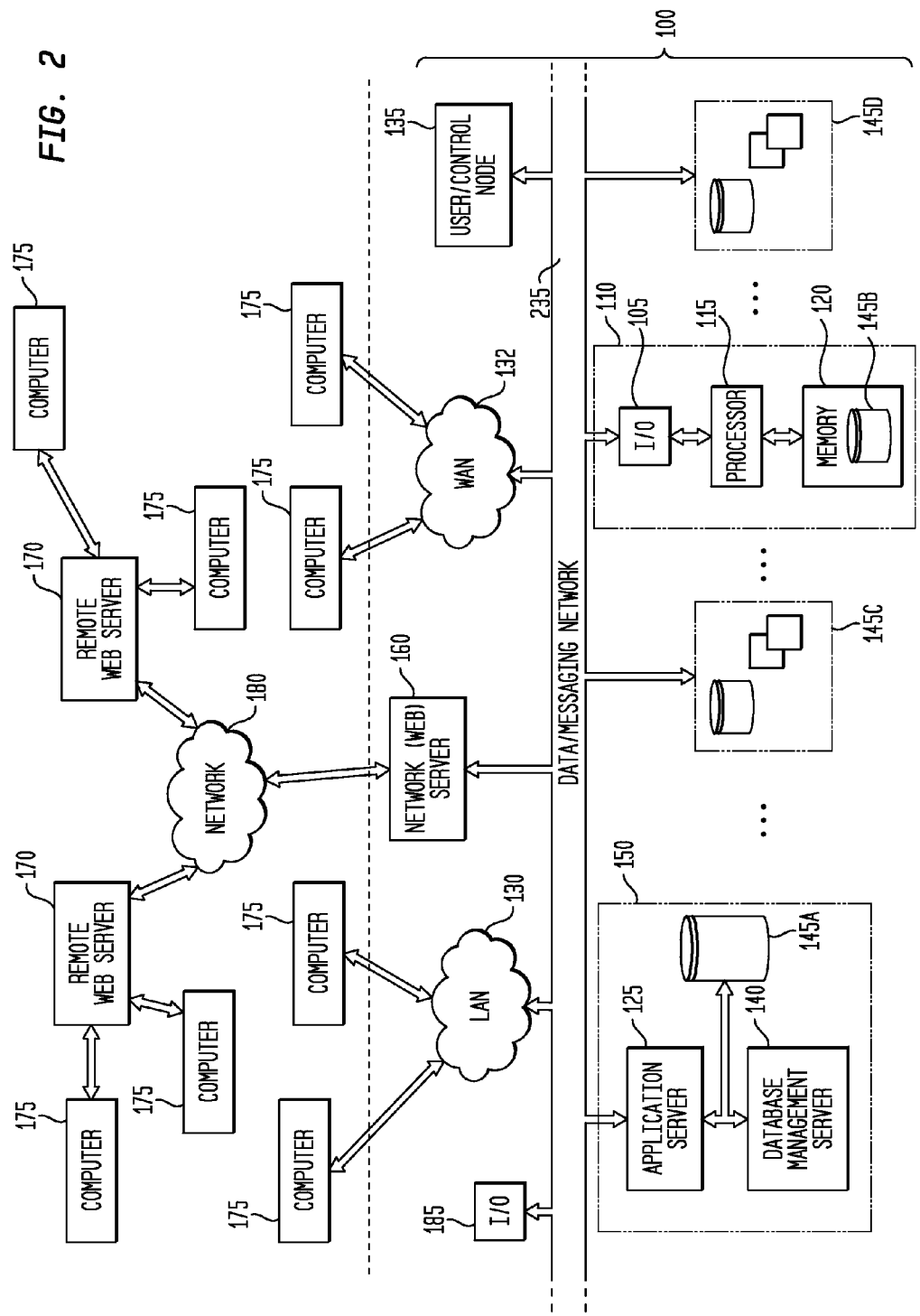
FIG. 2 is a block diagram illustrating a first exemplary system embodiment in accordance with the teachings of the present invention.

FIG. 2 is a block diagram illustrating a first exemplary system embodiment 100 in accordance with the present invention, with exemplary processing nodes 110 and 150, and with exemplary file and/or database systems 145, illustrated as file and/or database systems 145A, 145B, 145C and 145D. Such one or more processing nodes 110, 150 and file and/or database systems 145 may be programmed, adapted or configured with metadata, parameterized metadata, software, program or other computer instructions or configuration information to operate in accordance with the teachings of the present invention.

Figure 3:
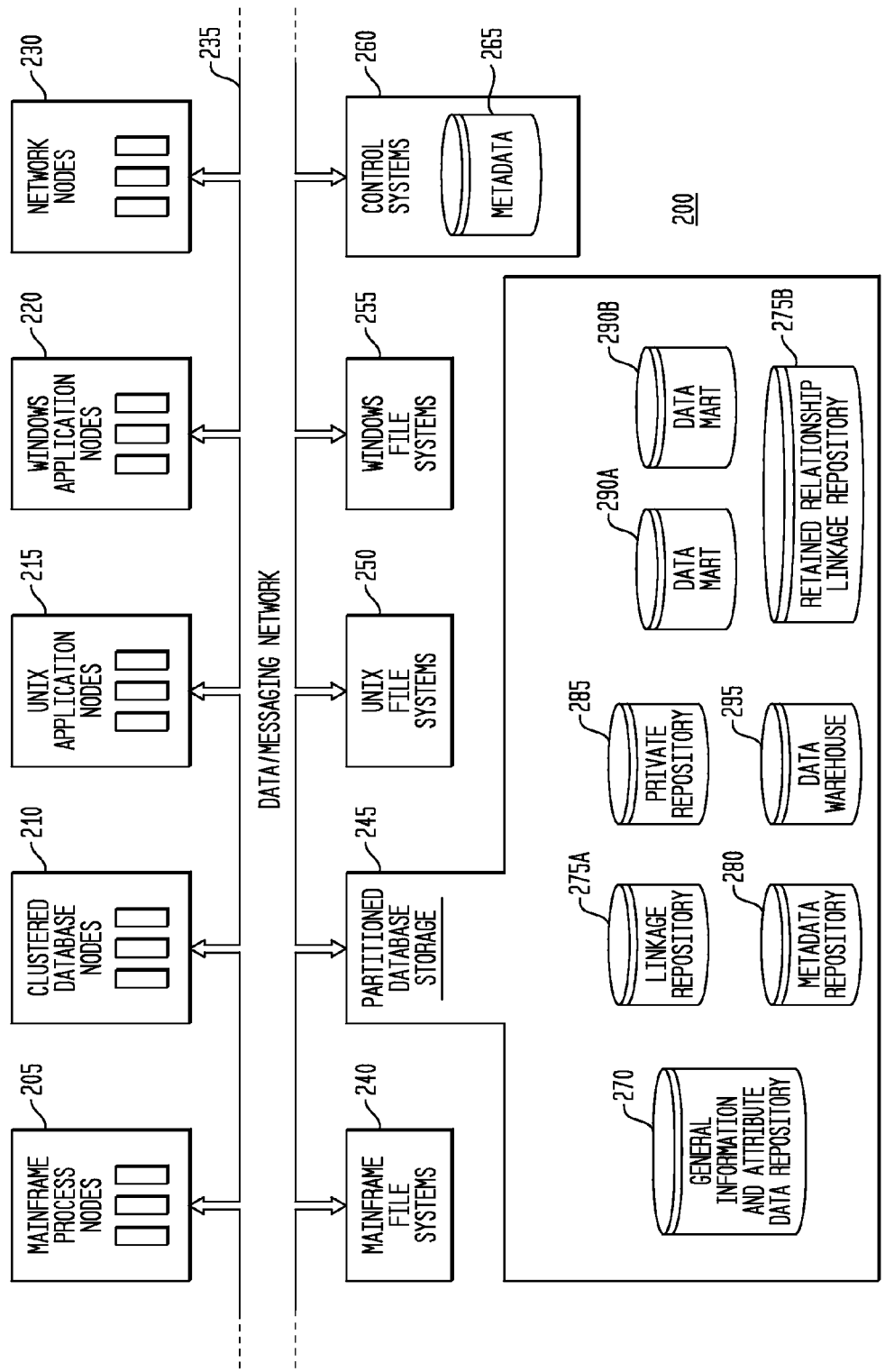
FIG. 3 is a block diagram illustrating a second exemplary system embodiment in accordance with the teachings of the present invention.

The system 100 may also be examined in conjunction with FIGS. 3 and 4, which are block diagrams illustrating second exemplary system 200 and third exemplary system 300 embodiments in accordance with the teachings of the present invention, and which provide a different level of detail of the various system embodiments (100, 200 or 300) and the various exemplary subsystems or nodes of the present invention. For example, referring to FIG. 3, depending upon the selected embodiment, the various one or more mainframe process nodes 205, clustered database nodes 210, Unix application nodes 215, Windows® application nodes 220, network nodes 230, and control systems 260 may include, be comprised of, or otherwise be represented by processing nodes 110 and/or 150. Similarly, the various data storage systems of FIG. 3, such as the mainframe file systems 240, partitioned database storage 245, Unix file systems 250, and Windows® file systems 255 may include, be comprised of, or otherwise be represented by database and/or file systems 145.

Correspondingly, referring to FIG. 4, depending upon the selected embodiment, the various processing elements such as data assembly processor 315, data reduction processor 325, aggregation processor 335, fulfillment processor 345, analytic recommendation processor 350, and data processing selection and planning node 355 may include, be comprised of, or otherwise be represented by processing nodes 110 and/or 150. Similarly, the various data storage systems of FIG. 4, such as the database, file and media systems 310, data warehouse 320, data mart 330, and analytics and segmentation processing data structure (data cube) 340 may include, be comprised of, or otherwise be represented by database and/or file systems 145. As a consequence, the methodology and systems of the present invention should be understood by those of skill in the art to be adapted to or capable of implementation using any form or type of hardware, currently known or which may become available in the future, with all such physical implementations considered equivalent and within the scope of the present invention. For example, exemplary processes which may currently operate on mainframe process nodes 205, such as legacy software applications, may be migrated or ported to other processing nodes, such as clustered database nodes 210, Unix application nodes 215, Windows® application nodes 220.

The various exemplary embodiments of the invention will be explained in detail with regard to a particular voluminous, computationally and data intensive process, such as marketing campaign management, segmentation and analysis. Those of skill in the art will recognize that the data structures, systems, principles, and procedures discussed below are equally applicable to other typically voluminous, difficult or intractable data processing tasks, with additional applications to diverse fields such as medical and scientific research, speech and signal processing, and so on, with additional illustrated examples discussed below.

As illustrated in FIG. 2, the processing node 110 is a computer system embodiment (e.g., a mainframe computer, a personal computer, a computer workstation, or any other computer having processing power sufficient to execute the exemplary method discussed below), comprising an input and output (I/O) interface 105, one or more processors 115, and a memory 120 storing one or more databases or file systems (individually and collectively referred to as data repositories) 145A. The memory 120 may be external, such as an external magnetic disk, tape, or optical drive, or may be internal, such as random access memory, cache memory, and so on. The processing node 150, such as an open or network system, comprises one or more data repositories (or databases) 145B (also embodied in a form of memory, discussed below), a database management server 140, and/or an application server 125. Additional file and/or database systems 145C and 145D are directly coupled to data/messaging network 235, for access from any processing node 110, 150, or other computer 175 (or other type of user interface) or user/control node 135. A "data repository", "database", and "data warehouse", as used herein, are considered interchangeable, and may be relational, object-oriented, object-relational, or use files or flat files, or any combinations of the above. Databases 145A, 145B, 145C, and 145D are instantiations of one or more databases, data warehouses, data marts, or data cubes, discussed in greater detail below. Reference to a "data cube" will be understood to mean a particular multidimensional instantiation of such a database 145, adapted in advance through an aggregation process (discussed below) for particularly responsive query processing, and which typically will have a plurality of different views which may be materialized (e.g., a lattice of views).

In the exemplary embodiments of processing node 150, the database management server 140 and the application server 125 may be implemented together, such as implemented within the application server 125. Either or both of the database management server 140 and the application server 125 are connected or coupled (or couplable) to the one or more data repositories (or databases) 145B, for full duplex communication, such as for database queries, database file or record transfers, database updates, and other forms of database communication. In the processing node 150, the database management server 140 and/or the application server 125 perform the methodology of the invention utilizing a correspondingly adapted, programmed or configured processor as discussed below (not separately illustrated), such as a processor 115 illustrated for processing node 110, in conjunction with one or more databases 145 (such as one or more databases 145B).

The databases 145A, 145B, 145C, and 145D may be ODBC-compliant (Open Database Connectivity), although this is not required for the present invention, or may be mainframe or proprietary. The processing node 110, processing node 150 and databases 145 are coupled to one another through a data and messaging network 235, typically implemented as one or more data and messaging busses, and may also be coupled to or may be part of a local area network ("LAN") 130 or a wide area network ("WAN") 132, such as for full duplex communication with a plurality of computers (or other terminals) 175, also for database queries, database file or record transfers, database updates, and other forms of database communication. The LAN 130, WAN 132, and data and messaging network 235 communication capability provides for local and remote access to the processing node 110, processing node 150 and databases 145, such as for large file transfers (or any batch processing, to the extent needed), and for processes such as control, and data selection and planning, through various computers 175 and one or more user/control nodes 135. In addition, the systems (100, 200, or 300) may also be directly accessible through input/output ("I/O") 185, such as for loading of records (e.g., magnetic tape records, disk records, or other media).

The various systems (100, 200, or 300) may also be included within or coupled to a larger data communication network 180, such as through network (or web) server 160, for full duplex communication with remote devices, such as a remote Internet or other network server 170 and remote computer (or other terminal) 175. In addition to local access through one or more local computers 175 and user/control nodes 135, such remote communication capability provides for the systems (100, 200, or 300) to be accessible for on-line functionality, discussed in greater detail below, such as for web-based access, using any current or future protocols, such as hypertext transfer protocol ("HTTP"), various email and file transfer protocols (e.g., SMTP, FTP), Transmission Control Protocol ("TCP"), Internet Protocol ("IP"), or any other forms of communication for data, voice or multimedia, for user input, selection, evaluation, reporting, and so on, discussed below. The user/control nodes 135 may be implemented as known or becomes known in the art, such as through a personal computer, a client-server embodiment, a data terminal, for example, typically having a monitor for display of information, such as a video display or computer monitor, and having data input means, such as a keyboard, pointing device (e.g., mouse, trackball, touch pad), joystick, scanner, touch screen, microphone, voice recognition system, keypad, and so on.

The data repository (or database) 145, illustrated as databases 145A, 145 B, 145C, and 145D, may be embodied in any number of forms, including within any computer or other machine-readable data storage medium, memory device or other storage or communication device for storage or communication of information such as computer-readable instructions, data structures, program modules or other data, currently known or which becomes available in the future, including, but not limited to, a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, a memory integrated circuit ("IC"), or memory portion of an integrated circuit (such as the resident memory within a processor IC), whether volatile or non-volatile, whether removable or non-removable, including without limitation RAM, FLASH, DRAM, SDRAM, SRAM, MRAM, FeRAM, ROM, EPROM or E$^2$PROM, or any other type of memory, storage medium, or data storage apparatus or circuit, which is known or which becomes known, depending upon the selected embodiment. In addition, such computer readable media includes any form of communication media which embodies computer readable instructions, data structures, program modules or other data in a data signal or modulated signal, such as an electromagnetic or optical carrier wave or other transport mechanism, including any information delivery media, which may encode data or other information in a signal, wired or wirelessly, including electromagnetic, optical, acoustic, RF or infrared signals, and so on.

The network 235 may be any type of bus or network structure or medium, using any selected architecture. By way of example and not limitation, such architectures include Industry Standard Architecture (ISA) bus, Enhanced ISA (EISA) bus, Micro Channel Architecture (MCA) bus, Peripheral Component Interconnect (PCI) bus, SAN bus, or any other communication or signaling medium, such as Ethernet, ISDN, T1, satellite, wireless, and so on. In the processing node 110, the I/O interface 105 may be implemented as known or may become known in the art, and as discussed with reference to FIG. 10, to provide data communication between the processor 115 and the network 235, using any applicable standard (e.g., one of the various PCI, USB or Ethernet standards, for example and without limitation).

The processing node 110 and processing node 150 further include one or more processors, such as processor 115 illustrated for processing node 110, and the other processors referred to in the other system embodiments discussed below. As the term processor is used herein, these implementations may include use of a single integrated circuit ("IC"), or may include use of a plurality of integrated circuits or other components connected, arranged or grouped together, such as microprocessors, digital signal processors ("DSPs"), parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components. As a consequence, as used herein, the term processor should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, EPROM or E$^2$PROM. A processor (such as processor 115), with its associated memory, may be adapted or configured (via programming, FPGA interconnection, or hard-wiring) to perform the methodology of the invention, as discussed above and as further discussed below. For example, the methodology may be programmed and stored, in a processor with its associated memory (and/or memory 120) and other equivalent components, as a set of program instructions (or equivalent configuration or other program) for subsequent execution when the processor is operative (i.e., powered on and functioning). Equivalently, when the processing node 110 and processing node 150 may implemented in whole or part as FPGAs, custom ICs and/or ASICs, the FPGAs, custom ICs or ASICs also may be designed, configured and/or hard-wired to implement the methodology of the invention. For example, the processing node 110 and processing node 150 may implemented as an arrangement of microprocessors, DSPs and/or ASICs, collectively referred to as a "processor", which are respectively programmed, designed, adapted or configured to implement the methodology of the invention, in conjunction with one or more databases 145.

An exemplary one or more data repositories (or databases) 145, in accordance with the present invention, contains public data, private data, survey data, limited access data, historical data, synthetic data, response data, intermediate result data, retained relationships (sets) data, etc., which themselves may be in the form of one or more relations and/or databases (as illustrated). In addition, exemplary databases 145 may contain the results of the method of the invention, as a data structure, discussed below. As mentioned above, "data repository" as used herein, is considered interchangeable with "database" and "data warehouse", and may be relational, object-oriented, or object-relational, or utilize any other database structure, in accordance with a selected embodiment. The database 145 may be integrated, namely, that the information resides within a singular, co-located or otherwise centralized database structure or schema, or may be a distributed database, with information distributed between and among a plurality of databases, some of which may be remotely located from the other databases. From another point of view, the database 145 may be considered integrated in that a plurality of different tables or types of tables, objects or relations are included within the database 145. (Use of any type of data repository, whether an integrated database, a non-integrated database, or any otherwise distributed or non-distributed database structures or schemas, are within the scope of the present invention. Unless otherwise specified, while referred to as tables, it should be understood that any such tables are to be construed broadly, to mean and include relations, objects, object relations, multidimensional relations, cubes, stars, snowflakes, flat files, or other similar or equivalent database constructs.)

The plurality of processing nodes (110, 150, 205, 210, 215, 220) and the other processors and processing nodes referred to as a data assembly processor 315, data reduction processor 325, aggregation processor 335, fulfillment processor 345, analytic recommendation processor 350, may be implemented using any form of server, computer, workstation, mainframe, or other computational device as known or may become known in the art, such as a server or other computing device having a processor, microprocessor, controller, digital signal processor ("DSP"), adaptive computing circuit, or other integrated circuit adapted, programmed or configured to perform the methodology of the present invention, such as a processor 115, as mentioned above. The system of the present invention generally comprises a memory storing a data repository (or database) 100 and one or more of such processors. The processor is programmed, using data processing software and using other software and data structures defined by the parameterized metadata of the invention, for example, to perform the methodology of the present invention. As a consequence, the system and method of the present invention may be embodied as software which provides such programming, such as a set of instructions and/or metadata embodied within a computer readable medium, discussed above.

More generally, the system, methods, metadata and programs of the present invention may be embodied in any number of forms, such as within any type of computer, within a workstation, within an application server such as application server 125, within a database management server 140, within a computer network, within an adaptive computing device, or within any other form of computing or other system used to create or contain source code, including the various processors and computer readable media mentioned above. Such source code further may be compiled into some form of instructions or object code (including assembly language instructions or configuration information). The metadata, software or source code of the present invention may be embodied as any type of source code, such as SQL and its variations (e.g., SQL 99 or proprietary versions of SQL), DB2, XML, C, C++, Java, Oracle, or any other type of programming language which performs the functionality discussed herein, including various hardware definition languages (e.g., Verilog, HDL), when embodied as an ASIC. As a consequence, a "construct", "program construct", "software construct" or "software", as used herein, means and refers to any programming language, of any kind, with any syntax or signatures, which provides or can be interpreted to provide the associated functionality or methodology specified (when instantiated or loaded into a processor or computer and executed, including any of the plurality of processing nodes (110, 150, 205, 210, 215, 220) or other processors and processing nodes referred to as a data assembly processor 315, data reduction processor 325, aggregation processor 335, analytic recommendation processor 350, or fulfillment processor 345, for example).

The metadata, software or other source code of the present invention and any resulting bit file (object code or configuration bit sequence) may be embodied within any tangible storage medium, such as within a memory or storage device for use by a computer, a workstation, any other machine-readable medium or form, or any other storage form or medium for use in a computing system. Such storage medium, memory or other storage devices may be any type of memory device, memory integrated circuit ("IC"), or memory portion of an integrated circuit (such as the resident memory within a processor IC), including without limitation RAM, FLASH, DRAM, SRAM, MRAM, FeRAM, ROM, EPROM or $E^2$PROM, or any other type of memory, storage medium, or data storage apparatus or circuit, depending upon the selected embodiment. For example, without limitation, a tangible medium storing computer readable metadata or software, or other machine-readable medium, may include a floppy disk, a CDROM, a CD-RW, a magnetic hard drive, an optical drive, a quantum computing storage medium or device, a transmitted electromagnetic signal (e.g., used in internet downloading), or any other type of data storage apparatus or medium, as mentioned above.

In addition, the various structures and components referred to in FIG. 2 are applicable to the other system embodiments discussed below and, in the interests of brevity, will not be repeated. Similarly, the various structures and components referred to in FIGS. 3 and 4 are applicable to the other system embodiments and, in the interests of brevity, will not be repeated. As a consequence, those of skill in the art will recognize that the various systems illustrated below may be embodied in the wide variety of structures and components discussed above and below, which are all within the scope of the present invention. As a further consequence, reference to any of the various systems (100, 200, or 300) should be understood to mean and include reference to any of the other systems (100, 200, or 300), unless otherwise specified.

Referring to FIG. 3, the exemplary system 200 provides a service oriented architecture ("SOA"), and includes a plurality of processing nodes, control systems, and storage or repository structures which are adapted to communicate with each other, and with other networks (as illustrated in FIG. 2 and not separately illustrated in FIG. 3), using data and messaging network 235, which may be implemented, for example, as various data and messaging busses or lines, or as other types of communication structures currently known or which becomes known. In exemplary embodiments, the data and messaging network 235 is implemented as two types of busses, one for large or high bandwidth data transfers, and another for messaging and comparatively smaller (lower bandwidth) data transfers, between and among the various nodes and storage devices.

Continuing to refer to FIG. 3, the various nodes include, without limitation, one or more mainframe processing nodes 205 (such as mainframe computers), one or more clustered database nodes 210, and other computing nodes with various operating systems, such as one or more Unix application nodes 215 and one or more Windows® application nodes 220. Communication nodes are also provided, using one or more network nodes 230, such as for LAN, WAN, Internet, and other network communications. For example, network nodes 230 generally include various application and web servers discussed above, and as illustrated in FIG. 4, for local or remote communication with users and operators of the system 200. One or more control systems 260 are also provided, which supply metadata (from data repository 265) defining the various system 200 applications, processes and services. The metadata of repository 265 is typically for static (or non-parameterized metadata), utilized for all of the processes discussed below. (Parameterized metadata, discussed below, is utilized to provide system variations and customizations, on a client- or user-specified basis.) The one or more control systems 260 typically further provide orchestration of the various applications, processes and services, such as timing, invocation, and ordering, and which typically provide other services, such as system status monitoring and management, billing, accounting, and so on. Not separately illustrated in FIG. 3, the system 200 may also include one or more interfaces (such as I/O 105 or 185) or drives for input of data on various media, such as tape, disk, CD, etc.

The various data storage systems generally may include without limitation, as needed depending upon and corresponding to the various processing and application nodes selected, one or more mainframe file systems 240, partitioned database storage 245, one or more Unix (or other operating mode) file systems 240, and one or more Windows® file systems 240. These storage elements may be implemented in a stored area network ("SAN") environment, in selected embodiments, with all processing nodes having data access through a dedicated SAN network, for example, and with messaging and control provided on a separate network or bus, which together form the network 235, as an exemplary embodiment. The partitioned database storage 245 may be embodied as one or more databases 145 discussed above, and includes without limitation a general information and attribute data repository 270 (such as an Experian INSOURCE® database, Z24® database, Circbase® database), a linkage repository 275A, a retained relationship linkage repository 275B, a metadata repository 280 such as for parameterized metadata (as may be specified or selected by a client or other data user), one or more private repositories 285 (such as for client data or other types of private or privileged data, with a separate private repository 285 implemented for each client), one or more data warehouses 295, and one or more data marts 290, illustrated as data marts 290A and 290B. The file systems 240, 250 and 255 may include any type of data storage systems, including databases, flat files, web (e.g., HTML or XML) pages, documents, and so on. In the exemplary embodiments discussed below, these file systems (such as Unix (or other operating mode) file systems 240 or Windows® file systems 240) may also include the data cube (OLAP) structures discussed below, such as one or more of the analytics and segmentation processing data structures illustrated in FIG. 4. (Alternatively, the metadata of repository 265 and the metadata repository 280 may be switched or reversed, with the metadata of repository 265 containing parameterized metadata, and the metadata repository 280 containing static or non-parameterized metadata.) The various file and database systems may be implemented as known or as may become known in the art, and all variations are within the scope of the present invention.

The various processing and application nodes (205, 215, 220) and database nodes 210 provide the various processes (also referred to as services) and applications discussed below, such as data reception and input, data layout, data conversion and correction, data audits, matching and linkage assignment, data coding, data enhancement, data linkage, data change detection and update services, data netdown, data suppression, data prioritization, data output (push) applications (such as automatic updates to client databases), variable formatting services, various fulfillment services (e.g., report generation, postal services, postal presort services, inkjet and other printing preparation services, shipping services, data extraction, email formatting, etc.). These services may be provided in a wide variety of orders, with the storage of any interim results (e.g., in retained relationships linkage repository 275B), using service orchestration provided by control systems 260.

The various processing and application nodes (205, 215, 220) and database nodes 210 further provide user- or client-specified services, generally through a graphical user interface ("GUI", not separately illustrated), such as via a computer 175 or user/control node 135, including data selection and processing planning, result reporting and analysis, report rendering, metadata parameterization, selection and entry, aggregation selection, attribute selection, analytics and segmentation processing, and web or other network hosting. In addition, the various processing and application nodes (205, 215, 220) and database nodes 210 also provide artificial intelligence services, as an analytic recommendation engine or processor, such as data modeling, data aggregation, data consultation, data analysis, and user interaction (illustrated as analytic recommendation processor 350 in FIG. 4), and also occasionally referred to herein as "virtual information consulting (or consultant)" services.

These various services and processes may be distributed between and among the various processing and application nodes (205, 215, 220) and database nodes 210 in a wide variety of equivalent ways, which may be a function of existing legacy systems, legacy software, customized software, software licenses, and costs and expenses. For example, computationally intensive tasks may be performed using comparatively inexpensive CPUs available on nodes 215 and 220, rather than using the potentially more expensive nodes 205 and 210. Also for example, certain processes which are invoked less frequently may be maintained on legacy systems, with other, more frequently executing processes ported to a plurality of nodes 215 and 220, for increased distributed and parallel execution. More specifically, such distributed processing, in conjunction with the linked and modular metadata of the present invention, also facilitates the capability of the systems (100, 200 and 300) for parallel and asynchronous execution of the plurality of processes of the present invention.

The linkage repository 275A stores and maintains a database having a plurality of unique and persistent identifiers (such as persistent identification numbers or "PINs"), with each PIN assigned to or associated with each individual, household, business, or other entity or object contained in the various other repositories, such as repository 270. In addition, the (entity) linkage repository 275A also maintains relationships between or among each such entity and various corresponding data entries or attributes, referred to generally as "entity linkage" or simply "linkage", to distinguish the metadata linkage of the exemplary embodiments. For example, an individual assigned PIN 1234 may be matched to hundreds or thousands of other records, including with name and address variations, and with other attributes such as age, gender, income, social security number, vehicle ownership, marital status, spouse name and address, children names and addresses, household identification, home ownership, purchasing histories, marketing responses, employment histories, and so on, along with any other attributes which may be maintained in repository 270, data warehouse 295, or in one or more private repositories 285. As a consequence, selection of a given PIN may be utilized to provide linkage and immediate access to all of the other maintained and related attribute information for the selected entity. For example, as discussed below with reference to FIG. 5, once a PIN is selected for storage in data warehouse 320, the entire history associated with each such PIN is immediately available, including all current and past information and relationships. In addition, as data is being processed, intermediate or interim results may be stored in retained relationship linkage repository 275B, as a plurality of PINs, such as separate sets of PINs resulting from different parameters (or versions) utilized in data suppression, data netdown, and data prioritization, for example.

As records or other data are input into the various systems (e.g., 100, 200 or 300), they may be matched to existing records using such PINs. Where the input records do not include corresponding PINs, they may be matched using matching logic as known in the art, and when a match is found, assigned the corresponding PIN. When a match is not found, the record is typically assigned a new PIN. The various PINs and other linkage data are maintained in linkage repository 275A. Such matching and PIN assignment is described in various publications, such as a related U.S. patent application Ser. No. 10/651,469, entitled "System, Method And Software For Providing Persistent Business Entity Identification And Linking Business Entity Information In An Integrated Data Repository", filed Aug. 29, 2003, inventors John L. Skurtovich, Jr. et al., which further claims priority to provisional application Ser. No. 60/474,350, filed May 29, 2003, which is commonly assigned herewith, and all of which are incorporated by reference herein, with priority claimed for all commonly disclosed subject matter.

Figure 6:
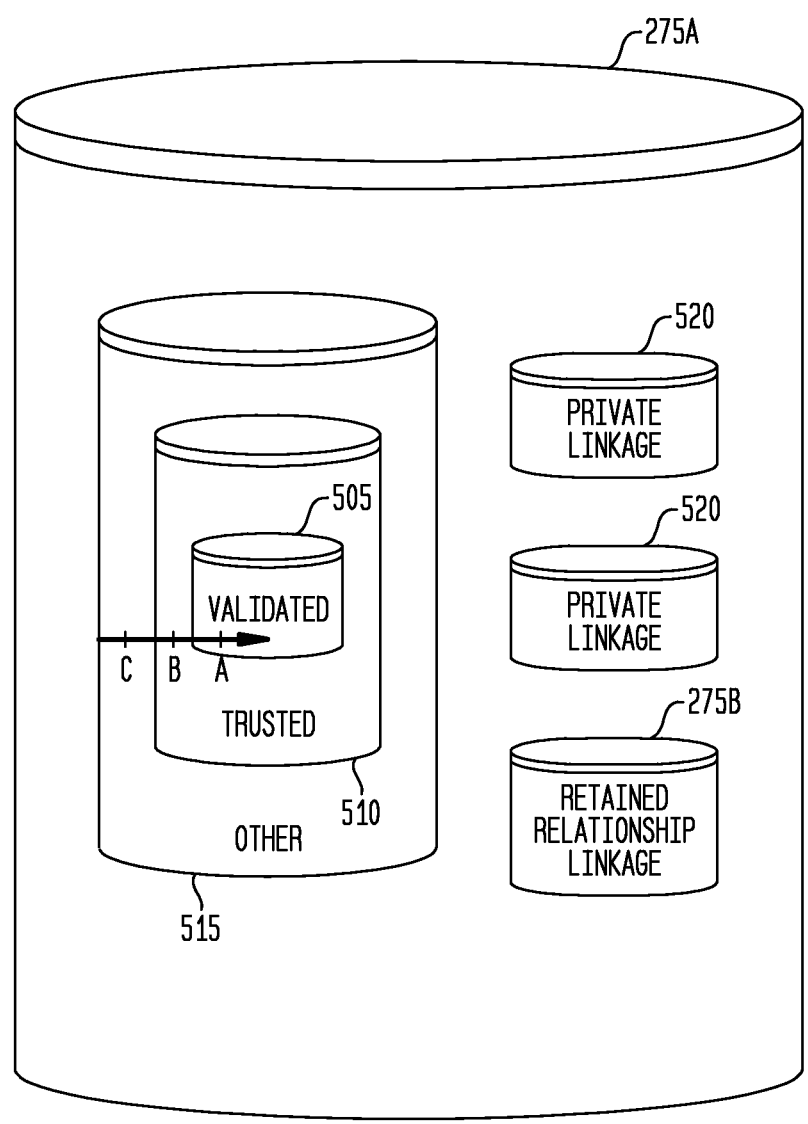
FIG. 6 is a block diagram illustrating an exemplary linkage repository embodiment in accordance with the teachings of the present invention.

Another novel feature of the linkage repository 275A is a layered implementation, based upon comparative confidence levels, as illustrated in FIG. 6. Referring to FIG. 6, at the deepest level is validated information 505, having a comparatively high confidence level ("A"), followed by trusted but non-validated information 510 having a somewhat lower confidence level ("B") in comparison to confidence level "A", followed by other information 515 having a somewhat lower confidence level ("C") in comparison to confidence levels "B" and "A", and further having one or more private linkage data stores 520, having any confidence level as determined by a given client or other data source, and the retained relationship linkage repository 275B. Each of these confidence levels provides a different "view" into the corresponding data, and may be selected by corresponding parameters reflecting corresponding confidence levels, such as through user input, client specifications, default values, etc. For example, when coarser-grained analysis will be utilized, such as at a household rather than individual level, less confidence may be required for matching, allowing use of trusted but non-validated information, rather than the stricter validated information. In addition, with higher confidence levels created, for example, through additional confirmatory or validating information, information may migrate or propagate inward, toward trusted and toward validated information, all through associated PIN information.

In accordance with the exemplary embodiments, these different confidence levels of linkage, representing validated or non-validated information, can be applied independently to any of the various attributes and entities, including individuals, households, and addresses, for example.

Instead of being limited to the one-to-one linkage of the prior art, in which one entity is linked to one identifier, another novel linkage feature of the present invention provides "many-to-many", "one-to-many" or "many-to-one" linkages, also using assigned and unique persistent identifiers or keys. These additional linkages are also maintained, as retained relationships, allowing the virtually instant accessibility of all such linked information. For example, such many-to-many linkages may associate multiple names to multiple addresses, such as two names of a couple, linked to multiple addresses, indicative of a household living arrangement. Similarly, a many-to-many linkage may associate multiple names with multiple mobile telephone numbers, such as available in a family or group mobile communications plan.

Also contrary to the prior art, the various systems (100, 200 or 300) maintain such linkage utilizing normalized relational data structures, without limiting the number of stored variations, despite the increase in processing complexity which has prevented prior art systems from using such normalized data structures. The systems (100, 200 or 300) provide such additional linkage by providing for distributed data processing, such as by using a plurality of processing and application nodes (205, 215, 220) and database nodes 210, where match processing may occur in parallel and asynchronously on multiple candidate sets. As a consequence, multiple pieces of data, for example, may be linked to multiple entities at the same time.

Another novel feature of the present invention, and as discussed in greater detail below, the various systems (100, 200 or 300) leverage the linkage system by retaining and storing interim results as "retained relationships" (in the retained relationship linkage repository 275B), that is, results which are produced in a first subprocess and which can be utilized as input into a second subprocess. For example, a set of PINs or other linkage identifiers, produced as result of a first subprocess, are stored separately from the final results produced by the second subprocess. As a consequence, such retained relationships allows the separation of a single process into a plurality of decoupled subprocesses, which may then be processed in parallel or in different orders, for example, rather than serially and in a predetermined order. In addition, such enabling of process separation and decoupling provides for additional advantages, such as the ability to separately customize the decoupled processes.

FIG. 4 is a block diagram illustrating a third exemplary system 300 embodiment in accordance with the teachings of the present invention. The operation of the system 300 is described in detail below with reference to FIG. 5. Referring to FIG. 4, the system 300 includes relational data structures such as database, file and media systems 310, data warehouse 320, data mart 330, and OLAP (on-line analytical processing) data structures, such as analytics and segmentation processing data structure (data cube) 340 (as database (or file) structures typically embodied using data storage elements such as mainframe file systems 240, partitioned database storage 245, Unix (or other operating mode) file systems 240, and Windows® file systems 240). For example and without limitation, in selected embodiments, analytics and segmentation processing data structure (data cube) 340 is embodied using Windows® file systems 240, while data mart 330 and data warehouse 320, respectively, are embodied as one of the data marts 290 and data warehouses 295 in partitioned database storage 245. The system 300 further includes data assembly processor 315, data reduction processor 325, data aggregation processor 335, fulfillment processor 345, data processing selection and planning node 355, control systems 260, and analytic recommendation processor (artificial intelligence (A/I) node) 350, as processors typically embodied using processing and application nodes (205, 215, 220) and database nodes 210, or more generally, as processing nodes 110 or 150 (with any incorporated processors 115).

The other illustrated components, such as user/control node 135, LAN 130, WAN 132, network (web) server 160, network 180, and computers (or user interfaces) 175, are utilized to provide user or client interaction and system control (such as input from a system monitor), and may be embodied as previously discussed with reference to FIG. 2. For example, the user/control node 135 or computers 175 (such as via LAN 130, WAN 132, or direct connection to node 355) may be utilized to provide operator, user or client access to the system 300, for activities such as marketing campaign management, including data input selection, attribute selection, parameter selection (using data processing selection and planning node 355), and to provide interactive segmentation and analysis (using analytics and segmentation processing data structure (data cube) 340). The various illustrated components are coupled to data/messaging network 235, for data and messaging transmission and reception, as discussed with reference to FIG. 3.

The database and processing architecture of FIG. 4, as discussed in greater detail below, provides tremendous advantages for processing large amounts of complicated data, such as in marketing campaign management. First, data which tends to change comparatively slowly is: (1) selected, using operator, user, client and artificial intelligence input from data processing selection and planning node 355 and/or user/control node 135; (2) input from database, file and media systems 310; and then (3) assembled by data assembly processor 315 and stored in data warehouse 320, with changes and other updates as needed. Data assembly processor 315 typically performs computationally intensive processes, such as data conversion and correction, linkage, data enhancement with additional fields or attributes, and other common data processing. The data assembly processor 315 may be distributed among a plurality of processing nodes (110, 150, 205, 210, 215, 220), and data assembly execution may occur in parallel and asynchronously, depending upon the selected embodiment. As a consequence, comparatively static information is warehoused and utilized to provide the data "universe" for selection and analysis, without these computationally intensive data operations needing to be repeatedly performed for subsequent modifications (e.g., changes in attribute selection) or subsequent creation of various permutations, combinations, selections, segmentations and analyses.

As not all of the information stored in data warehouse 320 will be utilized in a given or subsequent marketing campaign, but may be utilized in subsequent campaigns or other endeavors, to increase subsequent processing and query response speeds, the information stored in data warehouse 320 will be reduced, using various processes implemented by data reduction processor 325, with the reduced data stored in a data mart 330, typically implemented as a relational structure. This data reduction may be performed as needed or as desired, such as for other campaigns or other applications, and may result in a plurality of different data marts 330, each produced for the selected application, with corresponding selected information. For example, data reduction processor 325 may implement data netdown, data suppression, and data prioritization for one or more selected marketing campaigns. A particularly novel feature of the present invention, as these data reduction processes are performed, the interim results are stored, as "retained relationships", using corresponding PINs, in retained relationships linkage repository 275B. As a consequence, any reprocessing using different reduction criteria does not require complete reprocessing; instead, using the retained relationships, the previous set of non-reduced data may be recovered essentially immediately, and then reprocessed utilizing the new criteria. In addition, using the retained relationships, such processing and reprocessing may occur in a wide variety of orders, rather than a particular predetermined order.

The resulting information stored in data mart 330 is then aggregated, using data aggregation processor 335, based on selected attributes or dimensions also input from the operator, client, other user from data processing selection and planning node 355 or user/control node 135, or from analytic recommendation processor 350, and stored in analytics and segmentation processing data structure (data cube) 340, to facilitate virtually real-time segmentation, modeling, and analysis. Comparing the data mart 330 and the analytics and segmentation processing data structure (data cube) 340, the data mart 330 is typically not pre-aggregated and is a relational structure, and which may generally have a star or snowflake schema, for example and without limitation, and typically contains additional information which may not be needed for analysis, but may be useful for other processes, such as report generation. The analytics and segmentation processing data structure 340 is aggregated using selected attributes and dimensions; while typically referred to as a "data cube", it may be considerably more multidimensional (i.e., more than 3 dimensions of a cube), and is adapted for real-time responsiveness to input queries. For example, a client (through user interfaces or computers 175 or user/control node 135) may submit various queries for segmentation on certain attributes, such as age or income, and using those results, determine which individuals (represented in the analytics and segmentation processing data structure (data cube) 340) should receive marketing or promotional materials. In addition, during this process, based upon responses to past campaigns, or based upon analytical modeling of the individuals, households, businesses or other entities represented in data mart 330, analytic recommendation processor 350 may also suggest certain segmentations and analyses to provide an increased response rate for the current marketing campaign.

In this interactive process, a selection of individuals, households or businesses is made, for use in a current marketing campaign. The PINs of these individuals, households or businesses are then provided to fulfillment processor 345, which performs various fulfillment processes, such as generation of name and address information, generation of email addresses, variable formatting, layout, inkjet services, postal presort, other postal services, and so on, as mentioned above and as discussed in greater detail below.

FIG. 5 is a flow and block diagram illustrating an exemplary method embodiment in accordance with the teachings of the present invention, and illustrates an exemplary use of the system 300 with reference to marketing campaign management, execution and fulfillment. Referring to FIG. 5, the method begins, start step 400, with data selection and planning, step 405, which may include input and suggestions from analytic recommendation processor 350, providing data intelligence, step 410. For campaign management, step 400 typically includes designation of data repositories 412 and data sources 414, such as designation of private repository 285, general repository 270, and consumer or business lists to be provided as input and to be used for selection of individuals, households, businesses or other entities to receive marketing or promotional materials. During selection of such input data or lists (the provision of a "list of lists"), analytic recommendation processor 350 may provide data intelligence input (step 410), for example, based on previous response rates of certain data sources. Continuing with the example, analytic recommendation processor 350 may recommend lists D and E, instead of F and G, as having provided higher response rates in past client marketing campaigns.

In addition, data selection and planning of step 405, with provided data intelligence of step 410, will typically include attribute and feature selection. For example, various clients may determine that income, home ownership, and vehicle ownership are attributes which may be analyzed or modeled to provide meaningful selection for promotions, such as for marketing materials for computer sales. In addition, analytic recommendation processor 350 may suggest additional available attributes, based on past response rates or other modeling, such as response rates through different communication channels (e.g., direct mail, email, radio, television, etc.). Various orderings of processes or applications may also be selected; in accordance with the invention, each such ordering, through the parameterized metadata of the invention, results in a different application being processed in the system 300. Such ordering, and how each process will be performed, is part of the service orchestration provided by control systems 260. Other parameters will also be selected or input, such as confidence levels, various numbers or amounts (e.g., the type and size of the resulting marketing campaign, such as a catalogue mailing to 100,000 entities), selected or preferred formats, and so on. The various selections are incorporated into the parameterized and linked metadata, allowing for customization and individualization of the data processing, without coding changes.

It should be noted that a particularly novel feature of the present invention is that such data selection and planning (of steps 405 and 410), is not a static and time-constrained process, but is dynamic and variable, with changes and modifications allowed throughout the entire data processing of the invention. For example, initial parameters may be changed, in real-time and on the fly, with very limited reprocessing required. As indicated above, for data reduction, because interim results are stored as retained relationships, changes to data reduction parameters may be made subsequently and quite rapidly, including repopulating or rebuilding the data mart 330 and analytics and segmentation processing data structure 340. Indeed, using empirical results from data simulations for changes in the data reduction process, rather than taking approximately 3 hours to reprocess, in accordance with the present invention, such reprocessing occurred in less than one minute, resulting in over a 180-fold improvement. Such improvement of more than two orders of magnitude allows the various systems of the present invention to provide real-time analysis, unavailable in any prior art systems.

Following initial data selection and planning, the data assembly process may begin, step 415, and is typically performed by the data assembly processor 315. As illustrated in FIG. 5, such data assembly involves a wide variety of processes, illustrated as exemplary processes 415A through 415J, which may be individually selected or selected as needed, and which may occur in a wide variety of orders, depending upon the status of the data, its match capability, etc. Depending upon the selected embodiment, more or fewer of these processes 415A through 415J may be included, and may be performed as known or may become known in the art. The data assembly process of step 415 may also be interactive, depending upon the selected embodiment, with user, client or operator input provided (e.g., through computers 175 or user/control node 135), and through analytic recommendation processor 350.

Data is input, step 415A, such as received electronically or through input media, such as magnetic tape or disk. The data layout is determined, step 415B, such that the various systems (100, 200 or 300) may properly process the various input data fields. Depending upon the data, the data may be immediately matched and linkage (PINS) matched or assigned, as discussed above, step 415E; alternatively, this matching and linkage assignment may occur in other orders, such as after data conversion and correction. Also depending upon the data, data change detection and update (step 415J) may also occur immediately or in other orders, such as after data conversion and correction. Such change detection, for example, provides for required processing of only changed records, with unchanged records not requiring additional processing. Data conversion and correction (often referred to as data "hygiene") is performed, step 415C, such as conversion to known or standard formats, and corrected as needed, such as by updating or correcting addresses. Data coding is performed, step 415F, such as by adding codes to improve mail deliverability and provide for postal discounts, along with the provision of any data enhancements, step 415G, such as attaching additional selected attributes or dimensions, such as modeling scores, vehicle ownership, etc. Data audits may also be performed, step 415D, as selected by the client or other user. For example, a particular client or user may have a private repository 285, typically having a known format, which may then be audited to provide data corrections, updates, remove duplications, convert formats, and so on.

Typically, when multiple data sources have been input, such as multiple rented name lists, many of the same entities appear on more than one list. Using PIN linkage selection, step 415H, only one such entity is selected, such that duplicate names or entities are not stored in data warehouse 420 (providing the equivalent functionality to the prior art process of list merging and de-duplication, typically referred to as "merge/purge"). In addition, depending upon the selected embodiment, and as provided by parameters within the metadata, additional variables may be created, such as by combining attributes to create new variables, dimensions or attributes, typically as part of the data enhancement process, step 415G.

These various processes may also be applied to the other types of data discussed above, such as for speech and signal processing. For example, data input sources may be selected in data selection and planning step 405, such as speaker language selection, for speech recognition and synthesis, from appropriate data repositories 412 and data sources 414, such as repositories storing recorded and digitized speech samples for the selected language. The data assembly process 415 will also include data input 415A, data layout 415B, data coding 415F (such as coding of particular phonemes with corresponding prosodies and co-articulations), and data enhancement 415G, such as for providing modified samples for concatenation of phonemes to create appropriate co-articulations.

The data resulting from the data assembly process 415 is then stored in data warehouse 320, as step 420. For an exemplary campaign management embodiment, the stored data will typically include entity name and address information, persistent identifiers, entity history (as coded or maintained by retained relationships), and any other selected attributes and dimensions, and may be provided by any of the databases previously discussed, e.g., by the various databases contained in partitioned database storage 245. For an exemplary speech recognition or speech synthesis embodiment, the stored data will typically be a plurality of digital signals corresponding to selected phonemes of a plurality of dialects of one or more selected languages, with linkage to different speakers of different genders and ages, corresponding prosodies and co-articulations, for example.

Also in sharp contrast to the prior art, the data assembly process 415 of the present invention is not a batch process which may take hours or weeks to complete, with all parameters required to be specified prior to commencement of the assembly. Rather, such processes may be performed on a continuous basis, and may be performed in parallel and asynchronously; as data is input, it is processed and assembled, and moved into the data warehouse 320. Multiple data streams may be processed in parallel, and at any time, without regard to when other data streams are being processed. As a further consequence, and as discussed in greater detail below, other decisions may also be made later in the campaign management process, in real-time and based on actual data segmentation and analysis, providing a much more valuable process compared to the prior art. For example, the present invention allows the user to make decisions based on "what if" scenarios, using actual data analysis provided by the present invention. Effectively, use of the various embodiments of the present invention allow what was formerly "batch processing", occurring over several weeks, days or hours, to move into real-time processing.

Another novel feature of the present invention is that creation of a candidate data set has been completed with the creation of the data warehouse 320. Using retained relationships, such as through the linkage process, for example, no rematching is required due to subsequent changes in confidence levels. Through the linkage process, additional information may be automatically available (albeit having a different confidence level), resulting in "inherited" relationships, without any required reprocessing, as the complete relationship history has been retained through the PIN assignment and matching process.

Following creation of the data warehouse 320 in step 420, the data reduction process may begin, step 425, and is typically performed by data reduction processor 325. As illustrated in FIG. 5, such data reduction involves a wide variety of processes, illustrated as exemplary processes 425A through 425D, which may be individually selected or selected as needed, and which may occur in a wide variety of orders, depending upon the status of the data, and so on. Depending upon the selected embodiment, more or fewer of these processes 425A through 425C may be included, and may be performed as known or may become known in the art, but using the retained relationships feature of the present invention, step 425D.

The data netdown process or service 425A of the data reduction process typically creates matches, superkeys and other PINs or relationships, and may eliminate various entities. For example, members of the same household may be combined using a superkey or PIN, resulting in a reduction of several entities into one entity. Similarly, depending upon selected confidence levels, entities having separate PINs may be combined, such as the individual "E. Tagliere" combined with the individual "Eric Tagliere", also reducing the number of entities. The various entities eliminated in the data netdown process are stored, through their corresponding PINs, as a first data set, in one or more of the databases or memories, step 425D, such as stored in data warehouse 420. The data suppression process or service 425B is utilized to eliminate entities based on any selected attribute, such as eliminating entities based on postal codes, states, do not call lists, legal status (e.g., as a minor or as incarcerated), or previous inclusion in a solicitation, for example. Similarly, the various entities eliminated in the data suppression process are stored, through their corresponding PINs, as a second data set, step 425D, also in one or more of the databases or memories, such as data warehouse 420. The data prioritization (or hierarchy) process or service 425C is utilized to eliminate entities based on any selected priority; for example, an entity appearing on multiple lists may be selected as being from a less expensive list. Similarly, the various entities eliminated in the data prioritization process are stored, through their corresponding PINs, as a third data set, step 425D, also in one or more of the databases or memories, such as data warehouse 420. Similar data reduction processes are available in other embodiments, such as data netdown of speech samples (phonemes) based on speaker age, gender, and language dialect, for example.

Also as illustrated in FIG. 5, the data reduction process of step 425 may also be interactive, depending upon the selected embodiment, with user, client or operator input (e.g., through computers 175 or user/control node 135), and through analytic recommendation processor 350. For example, analytic recommendation processor 350 may provide data reduction selections based on previous results, such as previous marketing campaigns, or from various data models. Similarly, based on subsequent results and segmentations from previous iterations of this process, a client or operator may modify these data reduction processes, such as by adjusting metadata parameters.

As indicated above, the retained relationships, as one or more data sets, is one of the novel features of the present invention. Specifically, the retained relationships allow for rapid recomputations, based on any new or modified parameters. As indicated above, in comparison with the prior art, the retained relationships of the present invention have resulted in simulations having an improvement in processing speed of over two orders of magnitude.

The retained relationships also allow for parallel and asynchronous processing. For example, any of the various data reduction processes 425 may be performed in parallel and at any time, without regard to when other data reduction processes may occur, with interim results (as PINs) being stored in any of the various illustrated data storage devices. Following such parallel and asynchronous processing, final results may be determined, such as through various set operations, such as forming an intersection of the interim results from data netdown, data suppression, and data prioritization.

The results from the data reduction process are then stored in one or more data marts, step 430, such as a data mart 330. For example, variations from each such reduction process may be stored in a separate data mart 330, such as for multiple campaigns. The stored information, in selected embodiments, consists of PINs and selected attributes for subsequent use in segmentation and analysis, because selection of a PIN provides an immediate index or key into all other information associated with the PIN, again, without reprocessing. As indicated above, a data mart 330 is typically implemented utilizing a star or snowflake schema. Following creation of the data mart 330, a data aggregation process is commenced, step 435, using data aggregation processor 335, to provide one or more analytics and segmentation processing data structure 340, such as one or more multidimensional data cubes, illustrated as step 440.

This data aggregation process of step 435 converts the relational structure of the data mart 330 to an aggregated, OLAP structure, using any selected attributes or dimensions. The aggregation process is also typically interactive, with user/client input and intelligence provided by analytic recommendation processor 350, for selection of attributes or dimensions for aggregation. In addition, the aggregation process may also be iterative, with a given iteration based upon results from previous aggregations, and resulting segmentations, analysis, and reports. For example, selected dimensions for aggregations, as ranges of attributes or other attribute values, may initially include gender, age, household income, home ownership, postal code, profession, vehicle ownership by brand, and previous purchasing behavior by selected retailer. Continuing with the example, initial dimensions for the income attribute may be (in thousands) 0-25, 26-50, 51-75, and so on; dimensions for age may be (in years) 0-10, 11-15, 16-20, and so on; and dimensions for gender may simply be binary, such as 0 for male and 1 for female. Aggregation is then performed, aggregating or combining all PINs whose corresponding attributes meet each dimension, for each corresponding intersection of the dimensions, such as each PIN corresponding to an individual of the selected gender in the selected age range and the selected income range. Based on input from analytic recommendation processor 350 or previous iterations, subsequent aggregating dimensions may include number of children and eliminate vehicle ownership as a dimension. Analytics may also be utilized in the aggregation process, such as based on resulting scores from application of one or more data models. Again, given the novel system structure of the present invention, such interactivity and attribute selection changes may be performed without reprocessing the data itself, and is available through the retained relationships and linkage of the invention.

Following its creation, the analytics and segmentation processing data structure 340 may be queried, step 445, with the return of query results, step 450, in both an interactive and iterative process. For example, with user or operator interaction, step 455, and with intelligence input from analytic recommendation processor 350, the analytics and segmentation processing data structure 340 may be repeatedly queried, analyzing different segments of the OLAP structure, such as various intersections, slices or segments, to determine an optimal selection of entities, what information should be provided to them, and over what communication channel, for example. At each stage, a report may be generated, step 460, for use in additional analysis, or as a final report of such interactive selections.

Use of such an OLAP structure as analytics and segmentation processing data structure 340 is completely new to this voluminous and complex data processing, such as in campaign management. Previously, such campaign management has also been confined to mainframe computing involving set manipulations confined to large relational database structures. In accordance with the exemplary embodiments, OLAP structures have now been extended into data set theory and set manipulations, rather than merely arithmetic calculations such as sums and averages. In addition, as discussed in greater detail below with reference to FIG. 9, the present invention also provides for modified-OLAP functionality, to combine OLAP aggregation and segmentation capabilities with both set algebraic manipulations and operations, and with logical operations which provide processing to simulate set operations.

In addition, as another novel feature of the present invention, the aggregation of the present invention into the analytics and segmentation processing data structure 340 having an OLAP structure provides for real-time and modifiable segmentation and analysis, using any of the selected dimensions or attributes utilized in the aggregation, allowing any corresponding roll-up or drill-down operations in dimensions having those attributes, and again, having an interactive and iterative capability, using query determination (step 445) and query results (step 450). For example, a given analysis may roll-up geographic segments from household to postal code level; conversely, an analysis may drill-down in a geographic segment from state level to postal code level, or from a household level to an individual level.

For example, in addition to the set intersection operations involved in the aggregation of entities based upon the selected attributes for the OLAP dimensions, exemplary embodiments of the present invention also provides set summation operations, to provide for roll-up operations for the corresponding dimensions. As discussed in greater detail below, the exemplary embodiments provide entirely new OLAP functions, namely, set union and set difference operations. As a result, the exemplary embodiments provide for real-time "what if" analyses, heretofore unavailable in the art of marketing campaign management.

Yet another novel feature of the present invention is the movement of the decision-making process to the end of the campaign determination process. In the prior art, all such decisions had to be made at the commencement of the data processing for the marketing campaign, prior to the performance of batch processing, including selection of segmentation parameters or attributes. In accordance with the present invention, however, segmentation, analysis and modeling may all be performed in real-time, iteratively, interactively, and using actual data.

Once determinations have been made from the previous analytical steps, the process continues with fulfillment processing, step 465, typically performed by the fulfillment processor 345. For example, various fulfillment processes may be performed, such as generation of a magnetic tape, disk or electronic file having selected names and physical addresses, email addresses, with corresponding selected content and communication channel (e.g., who gets what offer or other communication and on what channel), selected formatting, postal presorting, inkjet services (e.g., mailing labels), and actual shipping or other execution, such as provision of emailing services.

The process may also include follow up procedures, such as response determination and modeling, step 470, which may be utilized in subsequent iterations, as discussed above, such as for feedback into the query process, as illustrated. Following steps 465 or 470, the method may end, return step 475.

Similar functions may be performed in the exemplary speech recognition and synthesis embodiment. For example, the aggregation process 435 may include dimensions based on dialect, gender, age, selected prosody, and so on, with subsequent analysis based on likelihood of fit of received speech to selected phoneme strings stored in the analytics and segmentation processing data structure 340.

The various systems (100, 200 and 300) of the present invention, while illustrated in greater detail with respect to marketing campaign management, may also be extended into other areas, such as customer management. For example, customer data may be merged with prospect data into a data warehouse 320, followed by the real-time segmentation, analysis and modeling of the present invention, for improved prediction capabilities. In addition, using the metadata linkage structure of the present invention, discussed below with reference to FIGS. 7 and 8, additional layers of functionality may be incorporated in a modular fashion, without requiring changes to the existing system, such as the addition of a wide variety of potential data modeling systems.

In addition, through the use of parameterized metadata, solutions may be customized, without requiring any hard recoding. For example, as mentioned above, confidence levels for matching requirements, and the various forms of data reduction of step 425, are provided using customizable parameters. In addition, attribute and dimension selection, for segmentation and analysis, are also provided based on customizable parameters. This parameterized metadata, and a new type of linkage provided at a metadata level, are discussed in greater detail below.

Figure 7:
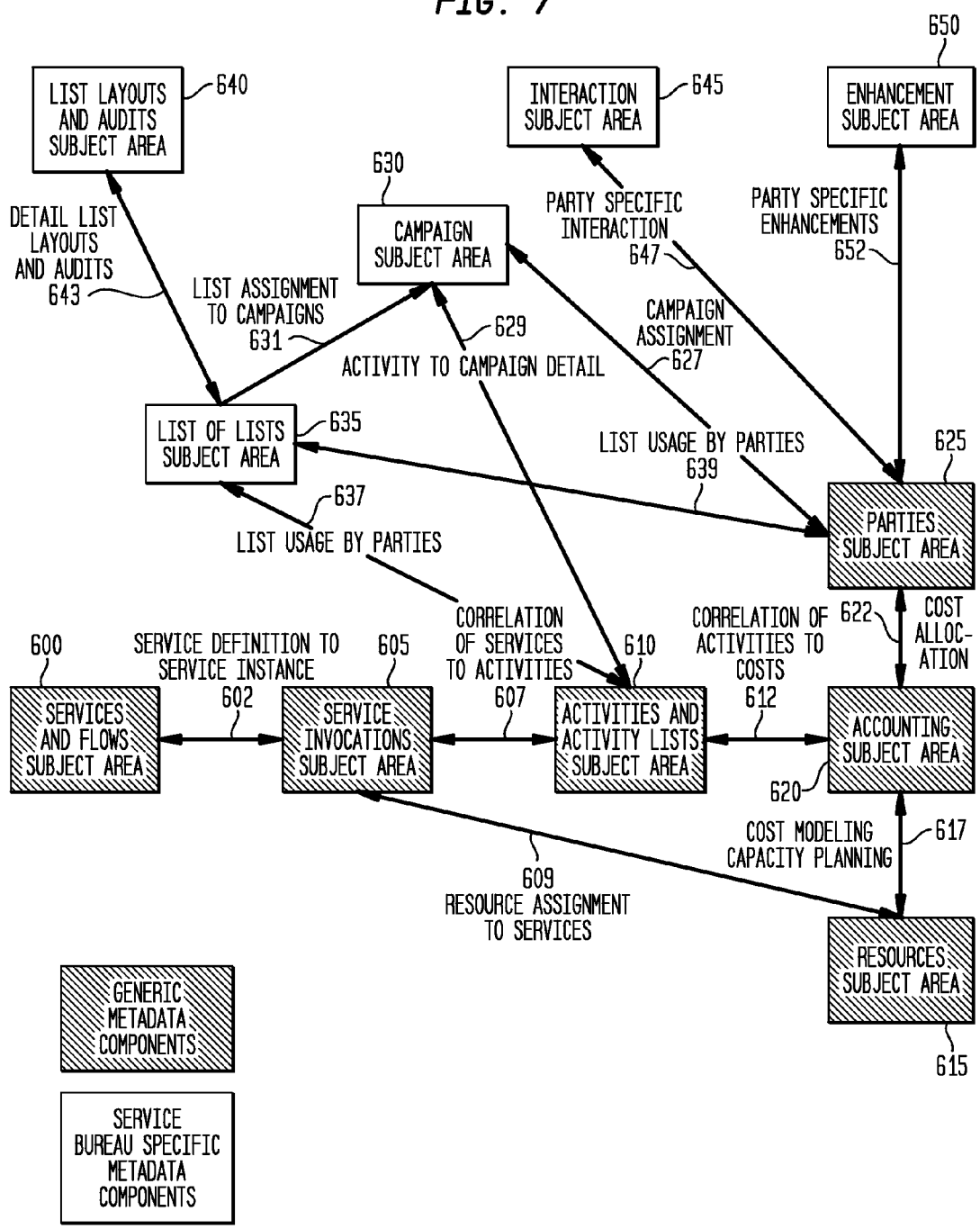
FIG. 7 is a diagram illustrating an exemplary metadata embodiment for an exemplary system embodiment in accordance with the teachings of the present invention.

FIG. 7 is a block diagram illustrating an exemplary metadata embodiment for an exemplary system embodiment, utilized in a marketing campaign management application, in accordance with the teachings of the present invention. As indicated above, the metadata of the present invention defines both data structures and data processes, allowing both to be accessed together in a relational form, with selectable parameters. The exemplary metadata is provided in a modular form, and allows versioning of the processes and services provided by the systems (100, 200 or 300), through parameter selection, allowing the creation of different process flows, the passing of information between processes, as parameters or return conditions, the linkage between different processes, and the provision of conditional services. For example, each process is given a name and stored in metadata, such that "services" being provided by the exemplary systems are metadata processes having parameters, defined inputs, and defined outputs, which may also link into other metadata modules. In addition, and as mentioned above, the metadata of the systems (100, 200 or 300) is an open model, allowing the introduction of additional services in a modular, "plug and play" manner. In exemplary embodiments, the metadata defines data structures in third normal form.

FIG. 7 further illustrates modular metadata, with linkage created between such modules ("metadata linkage"), such as through a shared or common parameter, a common process or process definition, a common process element or process flow, or a shared relationship or shared attribute. As illustrated, the various modules 600, 605, 610, 615, 620, and 625, with their corresponding metadata linkages, are generally applicable to any form of data processing (e.g., are generic for the exemplary system architectures), while the remaining modules are more specific and are illustrated as exemplary of a marketing campaign management or service bureau application. Similar metadata modules may be created for other types of data processing, such as for the various speech and signal processing applications discussed above. In should be noted that each of the various illustrated modules may themselves be comprised of additional modules and, conversely, may also be combined to form larger modules, all of which are within the scope of the present invention.

Referring to FIG. 7, a first metadata module 600 defines services (processes) and process flows which may be undertaken by the systems (100, 200 or 300), such as the various processes discussed above, e.g., data assembly. As part of this module 600, processes may be selected or specified, along with their orders and dependencies. Such service definitions are invoked through metadata link 602, linking service/process definitions to service/process instances, by second metadata module 605, to create a service instance (or instantiation), and to provide a record of what processes are occurring and when. In turn, each of these various services are comprised of corresponding activities (and lists of activities) defined in third metadata module 610, such as the repeated execution of matching processing, which are linked (metadata link 607), to correlate such services with their corresponding activities. For example, services being performed for a given client may involve multiple activities, such as a winter campaign (defined in 630) involving 10 different activities (610), for example, all linked to the corresponding services (600).

In addition, each of these various services utilize hardware resources defined in fourth metadata module 615, and are linked through metadata link 609, which provides resource assignment to the various services. Through these linkages, usage of various processes and hardware are tracked, allowing analysis of resource usage, which may also be utilized as an indication of an associated value of a process or activity (for example, activities which are invoked frequently may have more value than those invoked infrequently), and for planning for future growth. In turn, both third metadata module 610 and fourth metadata module 615 are linked (metadata links 612 and 617) to accounting services defined in fifth metadata module 620, to respectively correlate activities and resources to their corresponding costs and corresponding client billing, and further to provide cost modeling and capacity planning (metadata link 617). These general metadata modules are linked to the parties on whose behalf services and activities are being performed, as defined in sixth metadata module 625, through metadata link 622, providing cost allocations to corresponding parties (clients).

Similarly, for the exemplary marketing campaign management embodiment, parties such as clients or other users specified in sixth metadata module 625 are linked (metadata link 627) to their specified marketing campaigns defined and selected in seventh metadata module 630, such as through selection of the various parameters and processes discussed above. The sixth metadata module 625 is also linked (metadata link 622) to the fifth metadata module 620, to associate parties and corresponding accounting. The seventh metadata module 630 will indicate the type of marketing campaign, how frequently it will be performed, the campaign goals, and corresponding budgets. The seventh metadata module 630 defining a marketing campaign is also linked (metadata link 629) to the corresponding detailed activities comprising a selected campaign and defined in third metadata module 610, and linked (metadata link 631 (list assignment to campaigns)) to eighth metadata module 635, which defines the "list of lists" (i.e., list of data inputs) which can be selected and used as data input into a given campaign, matching campaigns to lists, for payment of list brokers, and for list selection. The eighth metadata module 635 is also linked (metadata link 637 (list usage by parties)) to the corresponding activities defined in third metadata module 610 which will be utilized in processing the selected lists (as different lists will generally have different associated activities), such as use of a first list for enhancement activity, and use of a second list for suppression activity; further linked (metadata link 639 (list usage by parties)) to the parties of sixth metadata module 625 utilizing the corresponding selected lists (as not every party will have access to all lists, such as private lists belonging to another party); and also linked (metadata link 643 (detailed list layouts and audits)) to the corresponding lists, data layouts and audits defined in ninth metadata module 640. For example, the ninth metadata module 640 defines, for each list or other data input which may be selected, the detailed data layouts and fields which will be processed. Similarly, parties such as clients or other users specified in sixth metadata module 625 are linked (metadata link 647 (party-specific interaction)) to their selected interactions specified in tenth metadata module 645, such as client-specific list priorities and suppression rules, and linked (metadata link 652 (party-specific enhancements)) to their selected data enhancements specified in eleventh metadata module 650, such as which data aggregations will be performed and which attributes included in formation of the client's data warehouse 320.

Figure 8:
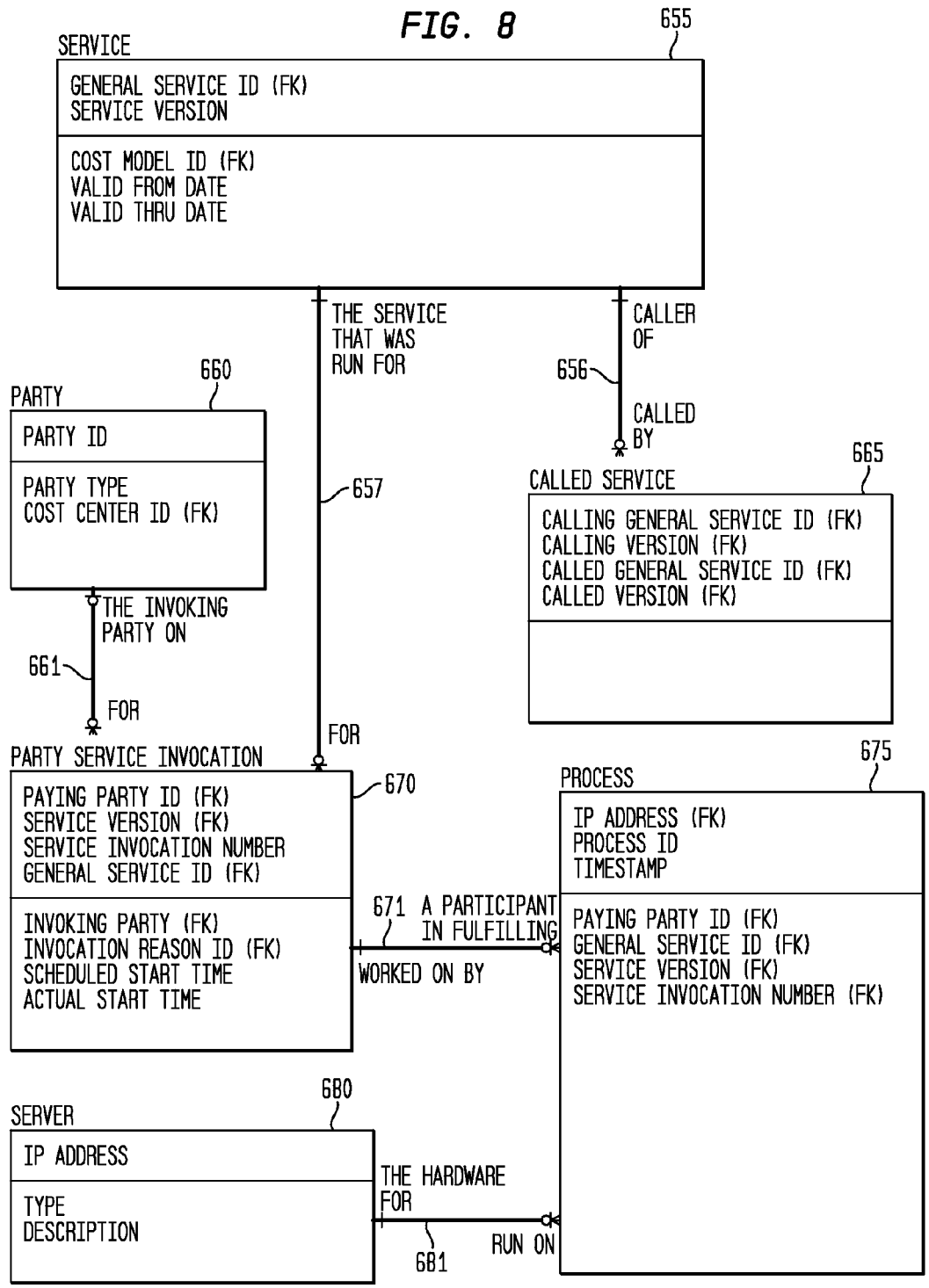
FIG. 8 is a diagram illustrating in greater detail exemplary metadata module embodiments and metadata linkages for an exemplary system embodiment in accordance with the teachings of the present invention.

FIG. 8 is a diagram illustrating in greater detail exemplary metadata module embodiments and metadata linkages for an exemplary system embodiment in accordance with the teachings of the present invention, and illustrates various entities, relations, and metadata linkages described above. As illustrated, Service entity or module 655 defines various services, service versions, cost models, and valid dates. Module 655 then has a one or zero to many relation (link 656) to Called Service entity or module 665, defining services and versions, and has a one or zero to many relation (link 657, linking services to parties) to Party Service Invocation 670, which defines or references parties, their services and service versions, the reason the service was invoked, and the scheduled and actual start times of the service. Party entity or module 660, defining parties, party type and cost center, also has a one or zero to many relation (link 661) to Party Service Invocation module 670, where the relation is not a dependency (indicated by the dashed line). Party Service Invocation module 670 is also linked by a one or zero to many relation (link 671) to Process entity or module 675, which defines processes, occurring at a given IP address, its timestamp, with additional links or relations to parties, services, service versions, and service invocations. Server entity or module 680 defining the server IP addresses, types and descriptions, which perform the various processes, in turn, also has a one or zero to many relation (link 681) to Process entity or module 675.

The metadata linkage and metadata parameterization of the present invention, as illustrated above for a selected application for marketing campaigns, provides a very significant advantage to the systems (100, 200 or 300). Most significantly, any such campaign may be customized by selection of corresponding parameters, which are then automatically linked throughout the system with referential integrity, without any coding changes, and without any user or operator intervention. Similarly, another service or functionality, such as modeling, may be incorporated into the systems (100, 200 or 300) by providing an additional metadata module, and corresponding linkage into at least one other module (which, in turn, provides pre-existing metadata linkage with the remaining modules). As a result, the metadata parameterization and the metadata linkage of the present invention allow full customization of the marketing campaign process while retaining full automation, and further allows modular expansion of the system to add new functionality.

Significantly, the metadata linkages of the present invention allow for elimination of custom program code writing for performance of data processing. The metadata linkages and parameterized metadata instead provide for implementation of generic rules to define a data process, with processes (such as a marketing campaign or a speech recognition process) modeled in a relational form, with the referential integrity between services/processes and selectable parameters utilized to customize the selected data process. As a consequence, selection of parameters and services results in automatic and customized process creation.

Those of skill in the art will recognize that the metadata of the exemplary embodiments of the present invention is in sharp contrast with prior art metadata, which has never been utilized to define not only data structures, but also to define processes and dynamic and static parameters. This new form of metadata allows a new level of generalization, with customization available through both process selection and parameter selection, without the prior art need for recoding or new code generation. Such metadata is also integral to the exemplary systems and processes, rather than merely providing tangential information (e.g., media "metadata" such as song title and performer of U.S. Patent Application Publication No. 2005/0015389 assigned to Microsoft Corp.). Similarly, the exemplary metadata of the present invention with explicit parameter selection for complete process customization is wholly dissimilar from other attempts at customizing prior art metadata (e.g., attempted customization of metadata through the use of wholly static metadata, with differences temporarily stored as "deltas" from the static metadata, illustrated in U.S. Patent Application Publication No. 2004/0181534 also assigned to Microsoft Corp.).

OLAP data structures, as indicated above, are adapted to provide rapid segmentation capabilities through pre-aggregation of data based on selected attributes or dimensions. Selection of multiple attributes or dimensions, moreover, results in the determination of an intersection of these various dimensions, such as a first set of PINs (as set "X") corresponding to individuals, for example, having annual incomes between $100,000 and $150,000, who drive Volvo automobiles, have 2 pets, and listen to National Public Radio's "All Things Considered" during their workday commute. Similarly, segmentation using different attributes or dimensions may result in a second set of PINs (as set "Y") corresponding to individuals, for example, who are married with 2 children, own their own home, watch cable and satellite television news programs, and prefer email communications. In addition, segmentation using different attributes or dimensions may result in a third set of PINs (as set "Z") corresponding to individuals, for example, who are married, own their own home, own a vacation home, travel to the Caribbean every winter, and prefer postal communications.

What OLAP data structures are not adapted to provide, however, is the group of individuals who are in set X, the group of individuals who are in set Y and not in set X, and the group of individuals who are in set Z and not in either set X or set Y, namely, mutually exclusive set operations, such as set difference operations and set union operations (without duplicate entries). For example, a user may want to conduct a mailing to individuals in sets X, Y and Z, but does not want to send duplicate communications to individuals who are in 2 or more sets. Using prior art OLAP data structures, such a determination grows exponentially with the number of sets involved. For example, using the segmented data available in an OLAP cube, to find the union of the 3 sets, 7 set determinations are required, as set X, set Y, set Z, set X intersection Y, set X intersection Z, set Y intersection Z, and set X intersection Y intersection Z, followed by set operations adding the individual sets, subtracting the paired intersections, and adding back in the triple intersection, i.e., X∪Y∪Z=(X+Y+Z)−(X∩Y)−(X∩Z)−(Y∩Z)−(X∩Y∩Z).

As a consequence, in accordance with the present invention, a modified-OLAP functionality is provided, in which OLAP aggregation and segmentation capabilities are combined with both algebraic manipulations and set operations to create union and difference operations. Using the modified-OLAP functionality of the present invention significantly reduces the number of required calculations, such that determinations only grows arithmetically with the number of sets involved, and not exponentially.

Figure 9:
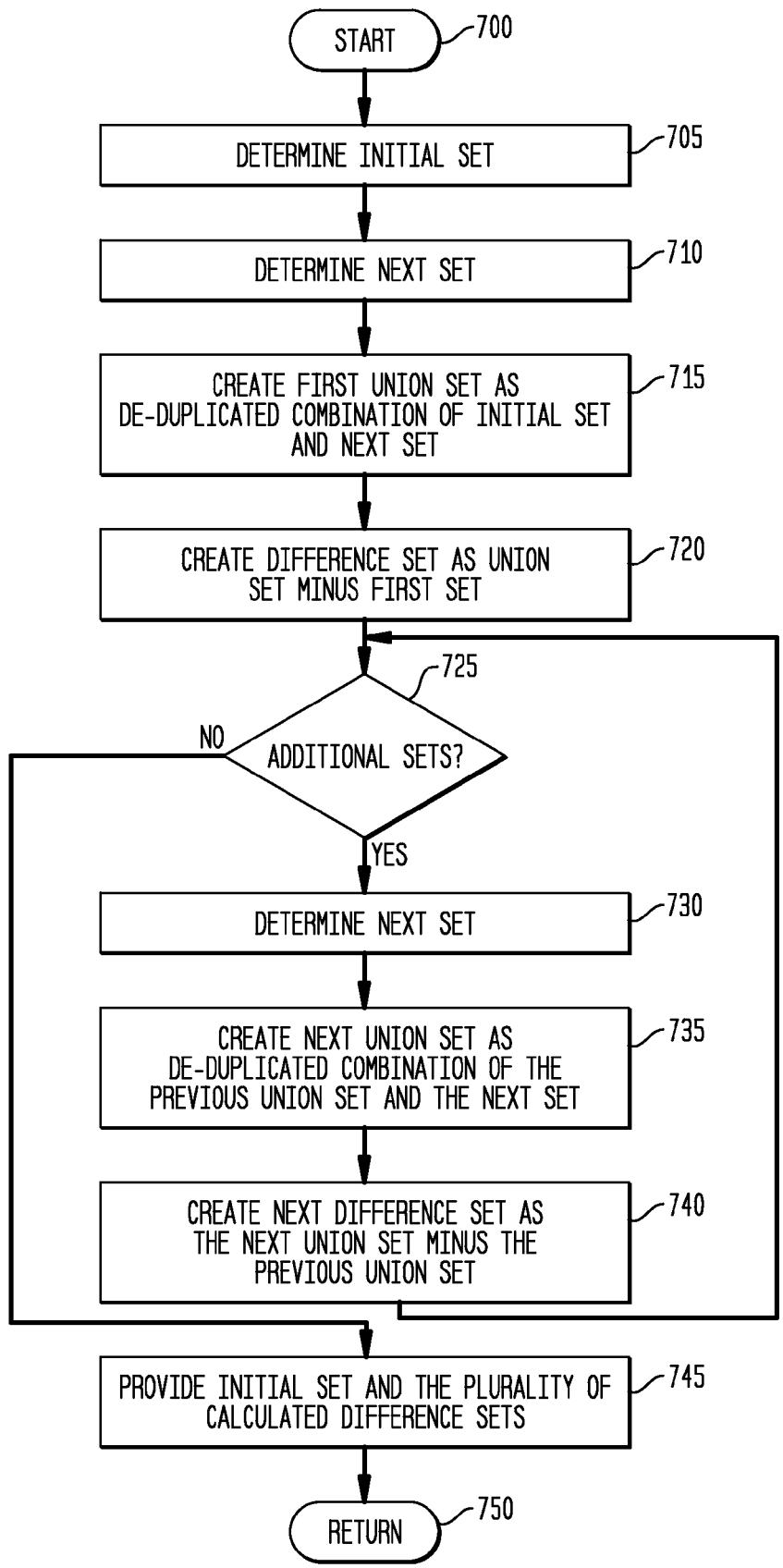
FIG. 9, is a flow diagram illustrating an exemplary method embodiment for set determination for modified-OLAP functionality in accordance with the teachings of the present invention.

FIG. 9 is a flow diagram illustrating an exemplary method embodiment for set determination for modified-OLAP functionality in accordance with the teachings of the present invention. The method is typically embodied as a suitably adapted or programmed processor of the plurality of processing nodes (205, 210, 215, 220) or within other processors and processing nodes referred to as a data assembly processor 315, data reduction processor 325, aggregation processor 335, or fulfillment processor 345. The method begins, start step 700, with determination of an initial set, step 705, such as a set "X". Each of the various sets determined by the method, including interim sets, are also stored in a memory (e.g., 120) or other data storage devices (e.g., 145, 240, 245, 250, 255), typically as a set of PINs. A next set is determined, step 710, such as set "Y". A first union set is created as a de-duplicated combination of the initial set and the next set (i.e., X∪Y), step 715, where duplication is eliminated by selection of only one PIN where the PIN is represented in more than one set. A first difference set is created as the first union set minus the first set (i.e., (X∪Y)−X), step 720, providing a difference set comprising those elements of set Y which are not also in set X.

Next, when additional sets are to be determined, step 725, a next set is determined in step 730, such as set "Z". A next union set is created as a de-duplicated combination of the previous union set and the next set (i.e., (X∪Y)∪Z), step 735. A next difference set is created as the next union set minus the previous union set (i.e., [(X∪Y∪Z)−(X∪Y)], step 740, providing a next difference set comprising those elements of set Z which are not also in sets X or Y. When there are additional sets to be determined, the method continues, step 725, returning to steps 730, 735 and 740, to continue to determine difference sets from the next union set minus the previous union set, creating a set of PINs which are not in any of the previously determined sets. When there are no more sets to be determined in step 725, the method provides or outputs the initial set and all of the one or more difference sets which have been calculated, step 745, and the method may end, return step 750. As a consequence, in the exemplary systems, a processing node is adapted to determine a plurality of mutually exclusive sets from a plurality of sequential union sets by forming a difference set by subtracting a previous union set from a next union set.

Figure 10:
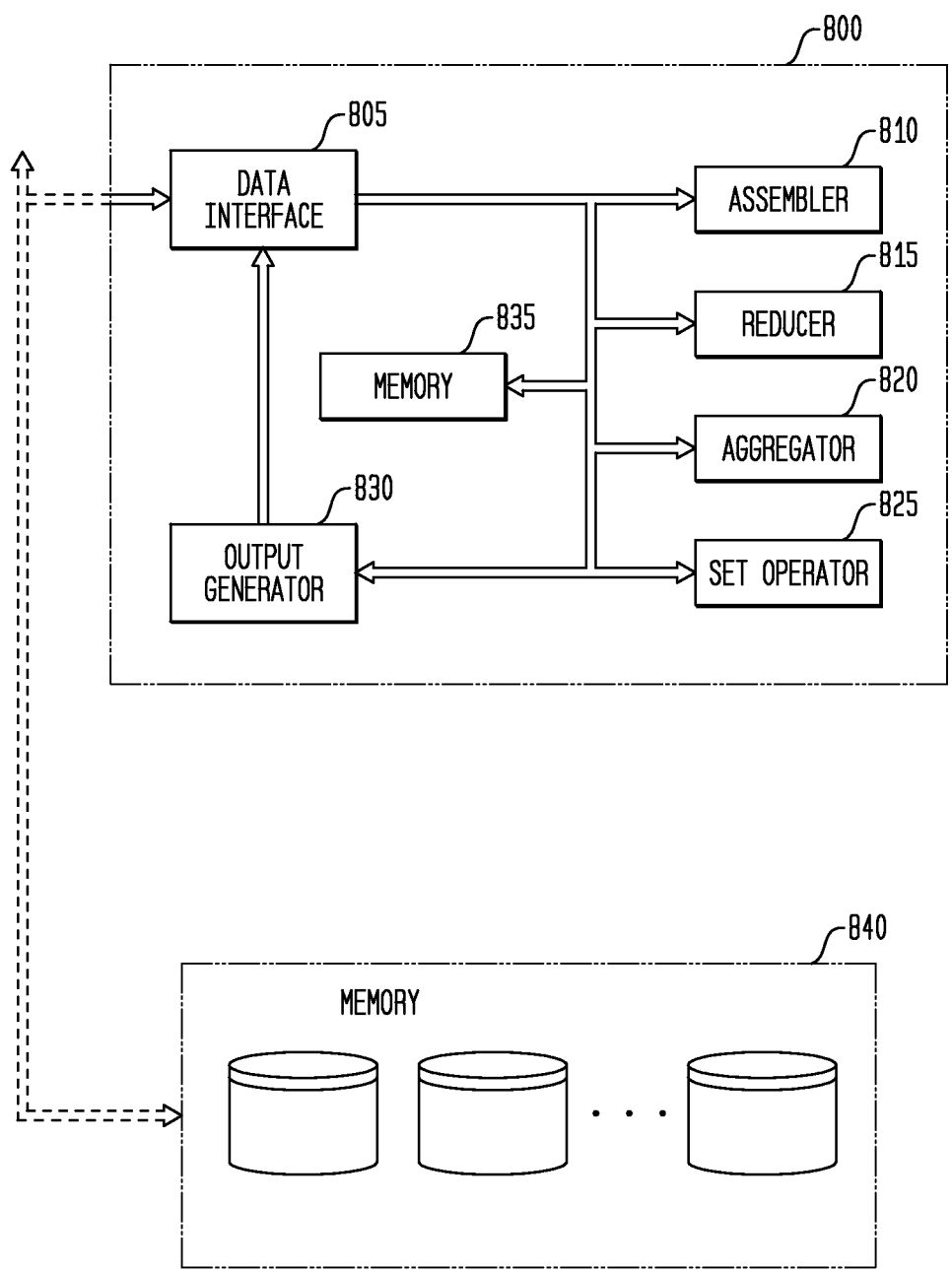
FIG. 10 is a block diagram of fourth system embodiment having one or more application specific integrated circuits (ASICs) in accordance with the teachings of the present invention.

FIG. 10 is a block diagram of fourth system 800 embodiment having a plurality of ASICs in accordance with the teachings of the present invention, and provides a useful summary. As illustrated, the system 800 comprises a data interface 805 (such as an I/O 185 or 105), an assembler 810, a reducer 815, an aggregator 820, a set operator 825, an output generator 830, all embodied as a plurality of ASICs, and a memory 835, which may be any form of memory discussed above (such as discussed with reference to memory 120). The data interface 805 is utilized for data input and output, and may be any kind or type of interface or I/O, such as a network interface. The assembler 810 performs the functionality discussed above with respect to the data assembly processor 315, and steps 415A-415J of the method embodiment. The reducer 815 performs the functionality discussed above with respect to the data reduction processor 325, and steps 425A-415D of the method embodiment. The aggregator 820 performs the functionality discussed above with respect to the aggregation processor 335 and step 435 of the method embodiment. The set operator 825 performs the functionality discussed above with respect to the set operations provided in the plurality of processing nodes (205, 210, 215, 220), such as the set union and difference operations discussed above with reference to FIG. 9, and the set intersection operations using the plurality of interim results from the data reducer, referred to above, for example. The output generator 830 performs the functionality discussed above with respect to the fulfillment processor 345 and step 465 of the method embodiment. Additional memory 840 may be provided, typically not as part of the SOC 800, for data storage for the data of the various data repositories and data structures of the present invention. In selected embodiments, a plurality of the systems 800 may be utilized in parallel, to provide high performance processing.

It will be apparent to those of skill in the art that while the various embodiments of the invention have been described primarily with respect to applications involved in marketing campaign management, the various systems and methods of the invention may be extended to numerous other fields, including other technical fields such as speech and signal processing.

For example, the present invention can be applied to speech, optical and signal processing, where vast quantities of data are collected and must be analyzed. For accurate speech recognition, vast data stores may be generated, for thousands of electronic signals. These electronic signal must be stored and associated with corresponding phonemes, for thousands of words, each from thousands of individuals, in many different languages. Again, vast quantities of data must be processed, and must result in a selection of words and corresponding pronunciations that meet certain criteria, such as having a likelihood of fit to selected phoneme patterns from a plurality of different speakers of a plurality of different languages, with high discrimination and noise immunity.

The various embodiments of the present invention provide for such signal processing and analysis, in real-time. Input signals may be sampled, categorized, matched to phonemes, and assembled into a data warehouse. Similarly, for optical character recognition, input signals are sampled, categorized, matched to expected characters, and assembled into a data warehouse. For subsequent analysis, using selection criteria and attributes, such as selected phonemes of particular dialects, the data may be reduced and stored in a data mart. This data may then be aggregated for a multidimensional data structure, which then supports real-time query processing for real-time data analysis, for use in speech recognition devices.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A tangible medium storing computer-readable program instructions for execution by a computer system for marketing campaign management and analysis, the tangible medium storing computer-readable program instructions comprising:
   one or more first metadata constructs defining a plurality of data processes for marketing campaign management, the plurality of data processes comprising at least one data assembly process and at least one data reduction process;
   one or more second metadata constructs having a first metadata linkage to the one or more first metadata constructs, the one or more second metadata constructs defining a first plurality of relational data structures for a first plurality of data repositories of the computer system and defining a multidimensional data structure for a second data repository for marketing campaign analysis;
   one or more third metadata constructs having a second metadata linkage to the one or more first metadata constructs, the one or more third metadata constructs defining a plurality of input data sources and a plurality of selectable attributes; and
   one or more fourth metadata constructs having a third metadata linkage to the one or more first metadata constructs, the one or more fourth metadata constructs defining a plurality of modifiable parameters, the plurality of modifiable parameters comprising parameters for selection of the plurality of input data sources and for selection of one or more data processes of the plurality of data processes for execution by the computer system.

2. The tangible medium storing computer-readable program instructions of claim 1, wherein the plurality of selectable input data sources comprise a plurality of databases and marketing lists containing at least one attribute selected from a group consisting of: a name attribute, an address attribute, a demographic attribute, a behavioral attribute, an attitudinal attribute, and combinations thereof.

3. The tangible medium storing computer-readable program instructions of claim 1, further comprising:
   one or more fifth metadata constructs for parallel and asynchronous execution of the one or more data processes by the computer system using the plurality of modifiable parameters.

4. The tangible medium storing computer-readable program instructions of claim 1, wherein the at least one data assembly process is selected from the group consisting of: a data input process, a data layout process, a data conversion process, a data correction process, a data audit process, a data matching process, a linkage assignment process, a linkage selection process, a data coding process, a data enhancement process, a data change detection process, a data update process, and combinations thereof.

5. The tangible medium storing computer-readable program instructions of claim 1, wherein the at least one data reduction process is selected from a group consisting of: a data netdown process, a data suppression process, a data prioritization process, and combinations thereof.

6. The tangible medium storing computer-readable program instructions of claim 1, wherein the plurality of data processes further comprise at least one data process to use the multidimensional data structure to process a received query and to provide a query response.

7. The tangible medium storing computer-readable program instructions of claim 1, further comprising:
   one or more sixth metadata constructs of to track one or more process invocations of a plurality of data process invocations.

8. The tangible medium storing computer-readable program instructions of claim 7, further comprising:
   one or more seventh metadata constructs to associate a cost factor with the one or more data process invocations of the plurality of data process invocations.

9. The tangible medium storing computer-readable program instructions of claim 7, further comprising:
   one or more eighth metadata constructs to associate a resource usage factor with the one or more data process invocations of the plurality of data process invocations.

10. The tangible medium storing computer-readable program instructions of claim 1, further comprising:
   one or more ninth metadata constructs defining a plurality of marketing campaigns, each marketing campaign of the plurality of marketing campaigns associated with one or more selections of data processes of the plurality of data processes, and each marketing campaign of the plurality of marketing campaigns associated with at least one party of a plurality of parties.

11. The tangible medium storing computer-readable program instructions of claim 1, further comprising:
one or more tenth metadata constructs to use the plurality of selectable attributes for a dimensioning and aggregating data for storage in the multidimensional data structure.

12. The tangible medium storing computer-readable program instructions of claim 1, wherein each of the first, second and third metadata linkages comprise at least one metadata linkage selected from a group consisting of: a common or communicated parameter of the plurality of modifiable parameters, a common or communicated attribute of a plurality of attributes, a common process definition, a common process flow, a communication between processes, and combinations thereof.

13. The tangible medium storing computer-readable program instructions of claim 1, further comprising:
one or more eleventh metadata constructs to determine at least one available variation of a plurality of available variations selected from a group consisting of: selectable data processes, selectable data attributes, selectable data segmentations, and combinations thereof.

14. The tangible medium storing computer-readable program instructions of claim 1, further comprising:
one or more twelfth metadata constructs to provide data modeling and data analysis using the plurality of modifiable parameters, the plurality of selectable input data sources, and the plurality of selectable attributes.

15. The tangible medium storing computer-readable program instructions of claim 1, further comprising:
one or more thirteenth metadata constructs to provide at least one selection recommendation for the plurality of modifiable parameters, the plurality of selectable input data sources, or the plurality of selectable attributes.

16. A tangible medium storing computer readable program instructions for execution by a computer system for marketing campaign management and analysis, the tangible medium storing computer readable program instructions comprising:
a plurality of metadata constructs, a first metadata construct of the plurality of metadata constructs defining a plurality of data processes for marketing campaign management, the plurality of data processes comprising at least one data assembly process and at least one data reduction process;
one or more additional metadata constructs each having at least one metadata linkage to the first metadata construct, the one or more additional metadata constructs defining a first plurality of relational data structures for a first plurality of data repositories of the computer system; defining a multidimensional data structure for a second data repository for marketing campaign analysis; defining a plurality of input data sources; defining a plurality of selectable attributes; providing a plurality of modifiable parameters for selection of one or more input data sources of the plurality of input data sources and for selection of one or more data processes of the plurality of data processes for execution by the computer system; and providing for use of one or more selectable attributes of the plurality of selectable attributes for dimensioning and aggregating data for storage in the multidimensional data structure.

17. The tangible medium storing computer readable program instructions of claim 16, wherein the plurality of selectable input data sources comprise a plurality of databases.

18. The tangible medium storing computer readable program instructions of claim 16, wherein the plurality of selectable input data sources comprise a plurality of marketing lists containing at least one attribute selected from a group consisting of: a name attribute, an address attribute, a demographic attribute, a behavioral attribute, an attitudinal attribute, and combinations thereof.

19. The tangible medium storing computer readable program instructions of claim 16, wherein the one or more additional metadata constructs further provide for parallel and asynchronous execution of the one or more data processes by the computer system using the plurality of modifiable parameters.

20. The tangible medium storing computer readable program instructions of claim 16, wherein the at least one data assembly processes is selected from the group consisting of: a data input process, a data layout process, a data conversion process, a data correction process, a data audit process, a data matching process, a linkage assignment process, a linkage selection process, a data coding process, a data enhancement process, a data change detection process, a data update process, and combinations thereof.

21. The tangible medium storing computer readable program instructions of claim 16, wherein the at least one data reduction process is selected from the group consisting of: a data netdown process, a data suppression process, a data prioritization process, and combinations thereof.

22. The tangible medium storing computer readable program instructions of claim 16, wherein the plurality of data processes further comprise processing a received query using the multidimensional data structure and providing a query response.

23. The tangible medium storing computer readable program instructions of claim 16, wherein the one or more additional metadata constructs further provide tracking of each data process invocation of a plurality of data process invocations.

24. The tangible medium storing computer readable program instructions of claim 16, wherein the one or more additional metadata constructs further provide association of a cost factor with each data process invocation of a plurality of data process invocations.

25. The tangible medium storing computer readable program instructions of claim 16, wherein the one or more additional metadata constructs further provide association of a resource usage factor with each data process invocation of a plurality of data process invocations.

26. The tangible medium storing computer readable program instructions of claim 16, wherein the at least one metadata linkage is selected from the group consisting of: a common or communicated parameter of the plurality of modifiable parameters, a common or communicated attribute of a plurality of attributes, a common process definition, a common process flow, a communication between processes, and combinations thereof.

27. The tangible medium storing computer readable program instructions of claim 16, wherein the one or more additional metadata constructs further provide for determination of a plurality of available variations of selectable data processes, or of selectable data attributes, or of selectable data segmentations, or combinations thereof.

28. The tangible medium storing computer readable program instructions of claim 16, wherein the one or more additional metadata constructs further provide data modeling and data analysis using the plurality of modifiable parameters, the plurality of selectable input data sources, and the plurality of selectable attributes.

29. The tangible medium storing computer readable program instructions of claim 16, wherein the one or more additional metadata constructs further provide at least one selection recommendation for the plurality of modifiable parameters, or for the plurality of selectable input data sources, or for the plurality of selectable attributes.

30. A tangible medium storing computer readable program instructions for execution by a computer system for marketing campaign management and analysis, the tangible medium storing computer readable program instructions comprising:
a plurality of metadata constructs, each metadata construct of the plurality of metadata constructs having at least one metadata linkage to at least one other metadata construct of the plurality of metadata constructs, and wherein the plurality of metadata constructs define a plurality of data processes for marketing campaign management; define a first plurality of relational data structures for a first plurality of data repositories of the computer system; define a multidimensional data structure for a second data repository for marketing campaign analysis; define a plurality of input data sources; define a plurality of selectable attributes; provide for use of the plurality of selectable attributes for dimensioning and aggregating data for storage in the multidimensional data structure; and provide a plurality of modifiable parameters for selection of the plurality of input data sources and for selection of at least one data process of the plurality of data processes for execution by the computer system.

31. The tangible medium storing computer readable program instructions of claim 30, wherein the plurality of selectable input data sources comprise a plurality of databases and marketing lists containing at least one attribute selected from the group consisting of: a name attribute, an address attribute, a demographic attribute, a behavioral attribute, an attitudinal attribute, and combinations thereof.

32. The tangible medium storing computer readable program instructions of claim 30, wherein the plurality of metadata constructs further provide for execution of the plurality of data processes by the computer system in parallel and asynchronously using the plurality of modifiable parameters.

33. The tangible medium storing computer readable program instructions of claim 30, wherein the plurality of data processes further comprise processing a received query using the multidimensional data structure and providing a query response.

34. The tangible medium storing computer readable program instructions of claim 30, wherein the one or more additional metadata constructs further provide for determination of a plurality of available variations of selectable data processes, or of selectable data attributes, or of selectable data segmentations, or combinations thereof.

35. The tangible medium storing computer readable program instructions of claim 30, wherein the one or more additional metadata constructs further provide data modeling and data analysis using the plurality of modifiable parameters, the plurality of selectable input data sources, and the plurality of selectable attributes.

36. A tangible medium storing computer readable program instructions for execution by a computer system for marketing campaign management and analysis, the tangible medium storing computer readable program instructions comprising:
a plurality of metadata constructs, each metadata construct of the plurality of metadata constructs having at least one metadata linkage to at least one other metadata construct of the plurality of metadata constructs, and wherein the plurality of metadata constructs define a plurality of data processes for marketing campaign management; define a first plurality of relational data structures for a first plurality of data repositories of the computer system; define a multidimensional data structure for a second data repository for marketing campaign analysis; define a plurality of input data sources; define a plurality of selectable attributes; provide for use of the plurality of selectable attributes for dimensioning and aggregating data for storage in the multidimensional data structure; provide a plurality of modifiable parameters for selection of the plurality of input data sources and for selection of at least one data process of the plurality of data processes for execution by the computer system;
wherein the plurality of data processes comprise at least one data assembly process, at least one data reduction process, and a received query and query response process using the multidimensional data structure.

* * * * *